(12) United States Patent
Khlat

(10) Patent No.: US 9,667,304 B2
(45) Date of Patent: *May 30, 2017

(54) RF DUPLEXING DEVICE

(71) Applicant: Qorvo US, Inc., Greensboro, NC (US)

(72) Inventor: Nadim Khlat, Midi-Pyrenees (FR)

(73) Assignee: Qorvo US, Inc., Greensboro, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/006,877

(22) Filed: Jan. 26, 2016

(65) Prior Publication Data

US 2016/0142198 A1    May 19, 2016

Related U.S. Application Data

(63) Continuation of application No. 13/718,148, filed on Dec. 18, 2012, now Pat. No. 9,356,643.

(60) Provisional application No. 61/581,318, filed on Dec. 29, 2011.

(51) Int. Cl.
*H04B 1/44* (2006.01)
*H04B 1/525* (2015.01)
*H04L 5/14* (2006.01)

(52) U.S. Cl.
CPC ............. *H04B 1/44* (2013.01); *H04B 1/525* (2013.01); *H04L 5/1461* (2013.01)

(58) Field of Classification Search
CPC .. H04B 1/525; H04B 1/44; H04L 5/14; H04L 5/16
See application file for complete search history.

(56) References Cited

U.S. PATENT DOCUMENTS

| 3,030,501 A | 4/1962 | Rapuano |
| 4,208,663 A | 6/1980 | Ogita |
| 4,907,218 A | 3/1990 | Inoue et al. |
| 5,148,128 A * | 9/1992 | Mazumder .......... H04L 27/2057 332/103 |
| 5,206,656 A | 4/1993 | Hannan |

(Continued)

OTHER PUBLICATIONS

Roussel, Alain, et al., "Frequency Agile RF Feedforward Noise Cancellation System," 2008 IEEE Radio and Wireless Symposium, Orlando, Florida, Jan. 22-24, 2008, pp. 109-112.

(Continued)

*Primary Examiner* — David Oveissi
(74) *Attorney, Agent, or Firm* — Withrow & Terranova, P.L.L.C.

(57) ABSTRACT

Radio frequency (RF) duplexing devices and methods of operating the same are disclosed. In one embodiment, an RF duplexing device includes a transmission port, a receive port, a first duplexer, and a second duplexer. The first duplexer is coupled to the transmission port and the receive port, and is configured to provide a first phase shift from the transmission port to the receive port. The second duplexer is also coupled to the transmission port and the receive port. However, the second duplexer is configured to provide a second phase shift that is differential to the first phase shift from the transmission port to the receive port. By providing the second phase shift so that the second phase shift is differential to the first phase shift, the RF duplexing device can provide isolation through cancellation without needing to introduce significant insertion losses.

20 Claims, 13 Drawing Sheets

(56) References Cited

U.S. PATENT DOCUMENTS

| | | | |
|---|---|---|---|
| 5,708,734 | A | 1/1998 | Van Der Tol |
| 6,016,129 | A | 1/2000 | Lauper |
| 6,288,679 | B1 | 9/2001 | Fischer et al. |
| 7,002,519 | B2 | 2/2006 | Wang et al. |
| 7,016,660 | B2 | 3/2006 | Meijer et al. |
| 7,725,082 | B2 | 5/2010 | Nakatani et al. |
| 8,364,092 | B2 | 1/2013 | Kouki et al. |
| 8,559,536 | B2 | 10/2013 | Hayashi et al. |
| 8,724,731 | B2 | 5/2014 | Hahn et al. |
| 2004/0251987 | A1 | 12/2004 | Nakamura et al. |
| 2007/0015468 | A1 | 1/2007 | Kouki et al. |
| 2007/0173210 | A1* | 7/2007 | Cho ............. H04B 1/52 455/78 |
| 2007/0243833 | A1* | 10/2007 | Nakatani ........ H04B 1/525 455/78 |
| 2008/0032745 | A1 | 2/2008 | Kim et al. |
| 2008/0242346 | A1 | 10/2008 | Rofougaran et al. |
| 2010/0302123 | A1 | 12/2010 | Knudsen et al. |
| 2011/0096766 | A1 | 4/2011 | Tudosoiu et al. |
| 2011/0212692 | A1 | 9/2011 | Hahn et al. |
| 2011/0260806 | A1 | 10/2011 | Takeuchi |
| 2011/0299632 | A1 | 12/2011 | Mirzaei et al. |
| 2012/0068893 | A1 | 3/2012 | Guterman et al. |
| 2012/0155335 | A1 | 6/2012 | Khojastepour et al. |
| 2012/0155336 | A1 | 6/2012 | Khojastepour et al. |
| 2012/0207065 | A1 | 8/2012 | Shida |
| 2013/0043961 | A1 | 2/2013 | Gebauer et al. |
| 2013/0082796 | A1 | 4/2013 | Schmidhammer |
| 2013/0114470 | A1 | 5/2013 | Lee et al. |
| 2013/0129018 | A1 | 5/2013 | Ko et al. |
| 2013/0135060 | A1 | 5/2013 | Lee et al. |
| 2013/0149975 | A1 | 6/2013 | Yu et al. |
| 2013/0201068 | A1 | 8/2013 | Alexopoulos et al. |
| 2013/0234806 | A1 | 9/2013 | Schmidhammer et al. |

OTHER PUBLICATIONS

Mikhemar et al., "A Tunable Integrated Duplexer with 50dB Isolation in 40nm CMOS," 2009 IEEE International Solid-State Circuits Conference, Session 22, ISSCC, 2009, pp. 386-388, California.

Non-Final Office Action for U.S. Appl. No. 13/718,148, mailed Jun. 6, 2014, 6 pages.

Final Office Action for U.S. Appl. No. 13/718,148, mailed Nov. 4, 2014, 8 pages.

Advisory Action for U.S. Appl. No. 13/718,148, mailed Jan. 28, 2015, 3 pages.

Non-Final Office Action for U.S. Appl. No. 13/718,148, mailed Sep. 9, 2015, 7 pages.

Notice of Allowance for U.S. Appl. No. 13/718,148, mailed Jan. 22, 2016, 7 pages.

Non-Final Office Action for U.S. Appl. No. 13/726,782, mailed Jun. 17, 2014, 18 pages.

Non-Final Office Action for U.S. Appl. No. 13/726,782, mailed Dec. 12, 2014, 16 pages.

Final Office Action for U.S. Appl. No. 13/726,782, mailed Jun. 26, 2015, 17 pages.

Advisory Action for U.S. Appl. No. 13/726,782, mailed Sep. 21, 2015, 3 pages.

Notice of Allowance for U.S. Appl. No. 13/726,782, mailed Dec. 22, 2015, 8 pages.

\* cited by examiner

RF DUPLEXING DEVICE

RELATED APPLICATION

This application is a continuation of U.S. application Ser. No. 13/718,148, filed Dec. 18, 2012, now U.S. Pat. No. 9,356,643, entitled "RF DUPLEXING DEVICE," which claims the benefit of U.S. Provisional Patent Application Ser. No. 61/581,318, filed on Dec. 29, 2011, entitled "DUAL PHASE TUNABLE DUPLEXER ARCHITECTURE," the disclosures of which are hereby incorporated herein by reference in their entirety.

FIELD OF THE DISCLOSURE

This disclosure relates generally to radio frequency (RF) duplexing devices and methods of duplexing RF signals.

BACKGROUND

A radio frequency (RF) duplexing device is a device that facilitates bi-directional communication (i.e., simultaneous reception and transmission) by a common antenna. In order to facilitate simultaneous reception and transmission by the antenna, the RF duplexing device operates at both an RF receive band of an RF receive signal and an RF transmission band of an RF transmission signal. One of the primary challenges of duplexing is that the RF transmission signal and the RF receive signal can interfere with one another. Furthermore, upstream RF circuitry for the RF transmission signal can distort the RF transmission signal, while downstream RF circuitry for the RF receive signal can also distort the RF transmission signal. So that the RF transmission signal and the RF receive signal can comply with spectral requirements, the RF duplexing device needs to provide adequate isolation between transmission channels and receive channels.

A typical RF duplexing device provides additional isolation by increasing impedances and/or providing a higher amount of attenuation between transmission and receive channels. However, this results in greater insertion losses and thereby reduces power efficiency performance of the RF duplexing device. As both power efficiency standards and spectral requirements become more demanding, better techniques are needed to provide greater isolation between transmission and receive channels.

SUMMARY

This disclosure relates generally to radio frequency (RF) duplexing devices and methods of operating the same. In one embodiment, an RF duplexing device includes a transmission port, a receive port, a first duplexer, and a second duplexer. The first duplexer is coupled to the transmission port and the receive port, and is configured to provide a first phase shift from the transmission port to the receive port. The second duplexer is also coupled to the transmission port and the receive port. However, the second duplexer is configured to provide a second phase shift that is differential to the first phase shift from the transmission port to the receive port. By providing the second phase shift so that the second phase shift is differential to the first phase shift, the RF duplexing device can provide isolation through cancellation without needing to introduce significant insertion losses.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 1:
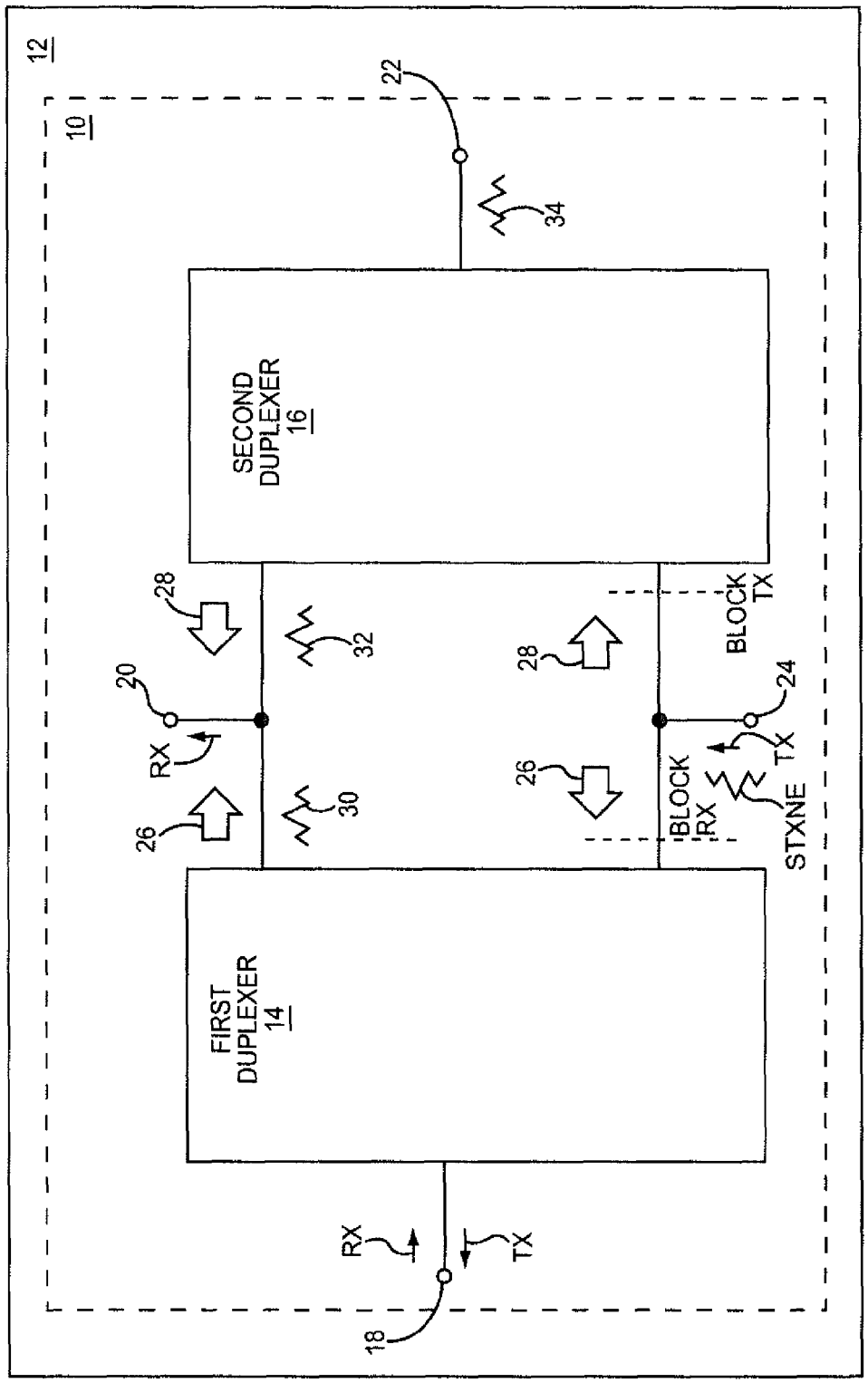
FIG. 1 illustrates a block diagram of an exemplary radio frequency (RF) duplexing device that includes a first duplexer configured to provide a first phase shift from a transmission port to a receive port, and a second duplexer configured to provide a second phase shift that is differential to the first phase shift of the first duplexer from the transmission port to the receive port.
Figure 2:
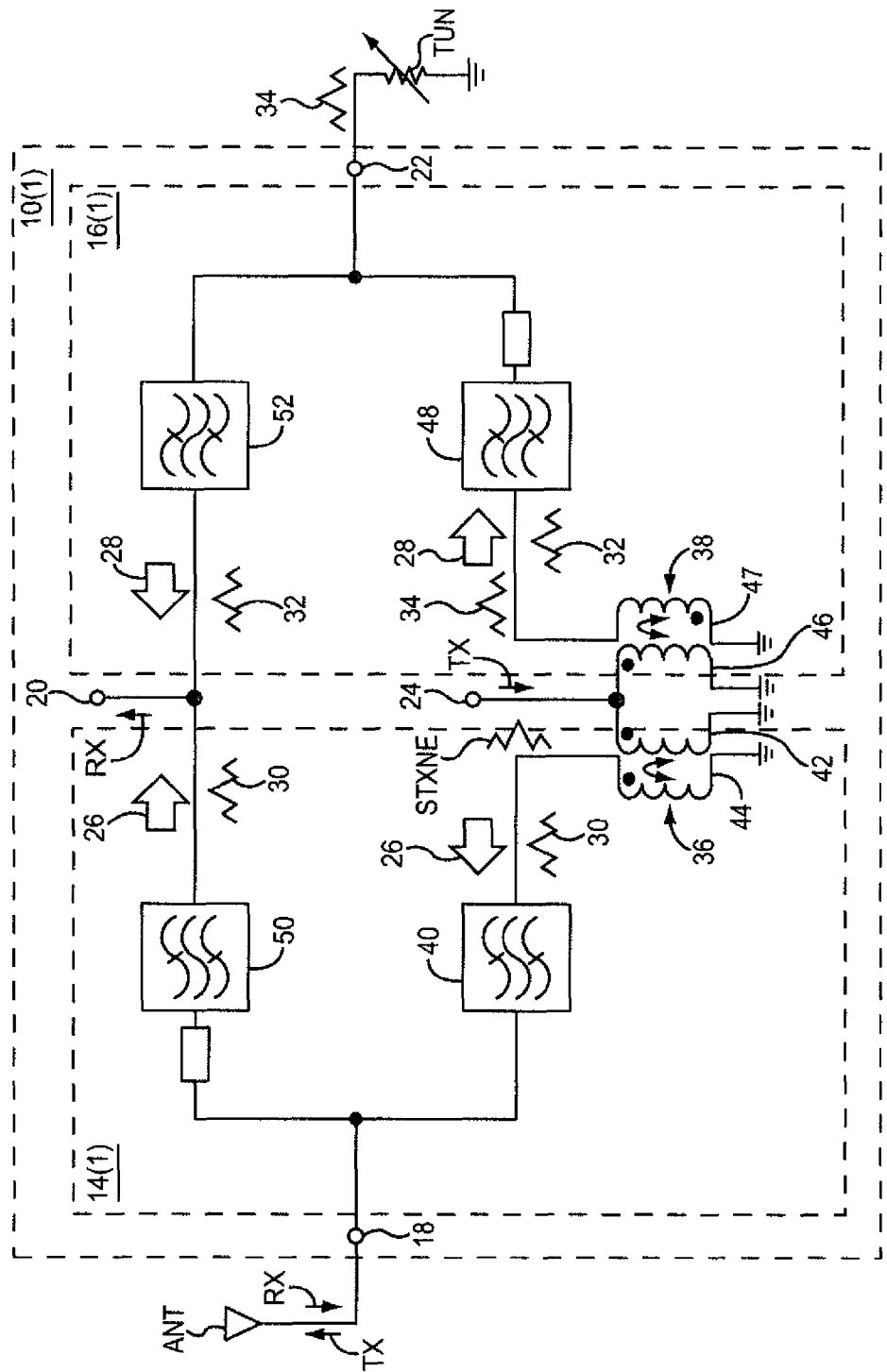
FIG. 2 illustrates an embodiment of the RF duplexing device shown in FIG. 1 where the first duplexer includes a non-inverting transformer and the second duplexer includes an inverting transformer.
Figure 8:
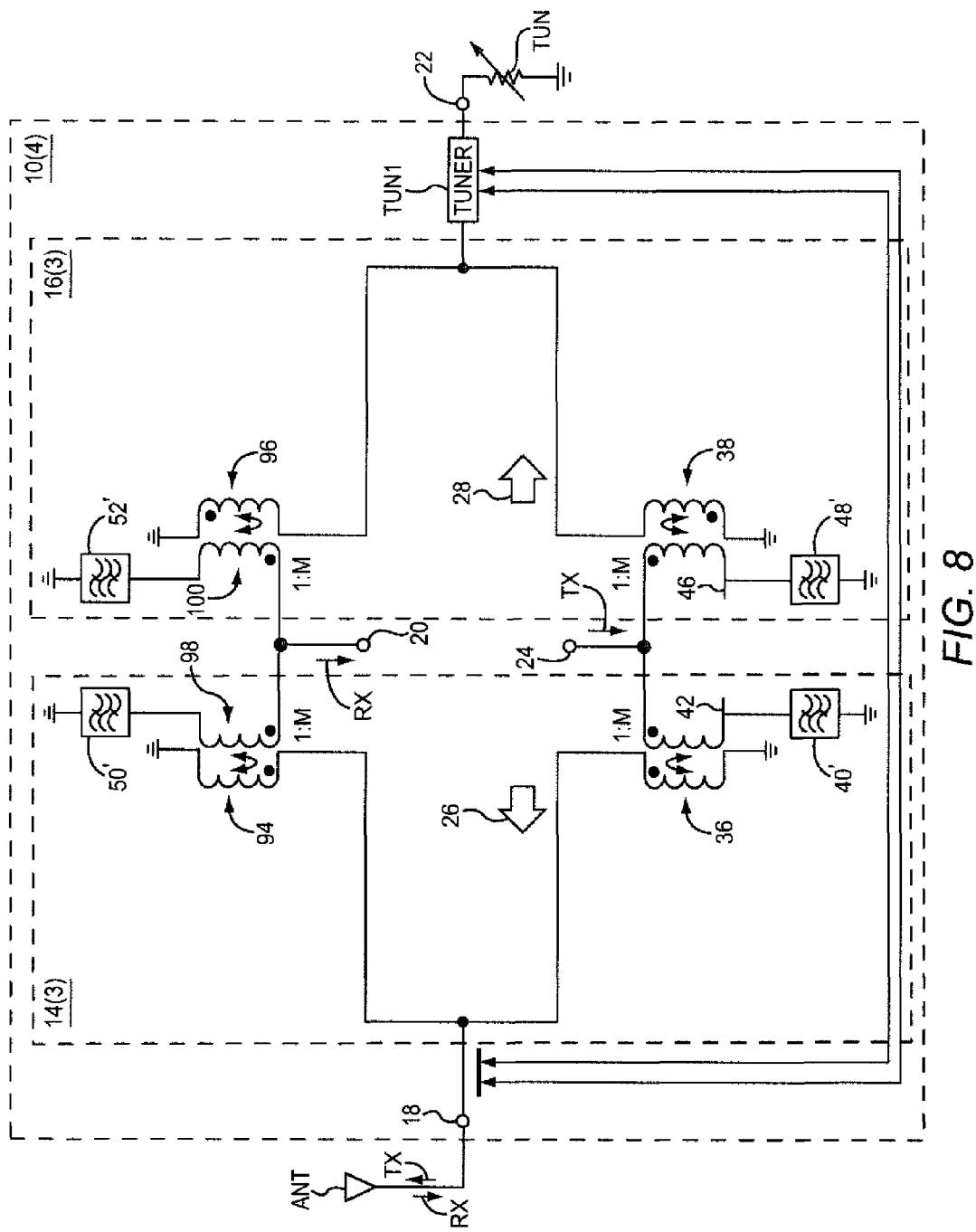

FIG. 8 illustrates another embodiment of the RF duplexing device shown in FIG. 1, where the non-inverting transformer and the inverting transformer are coupled to the transmission port as in the embodiment shown in FIG. 2, but an additional non-inverting transformer is coupled to the receive port in the first duplexer and an additional non-inverting transformer is coupled to the receive port in the second duplexer.

Figure 9:
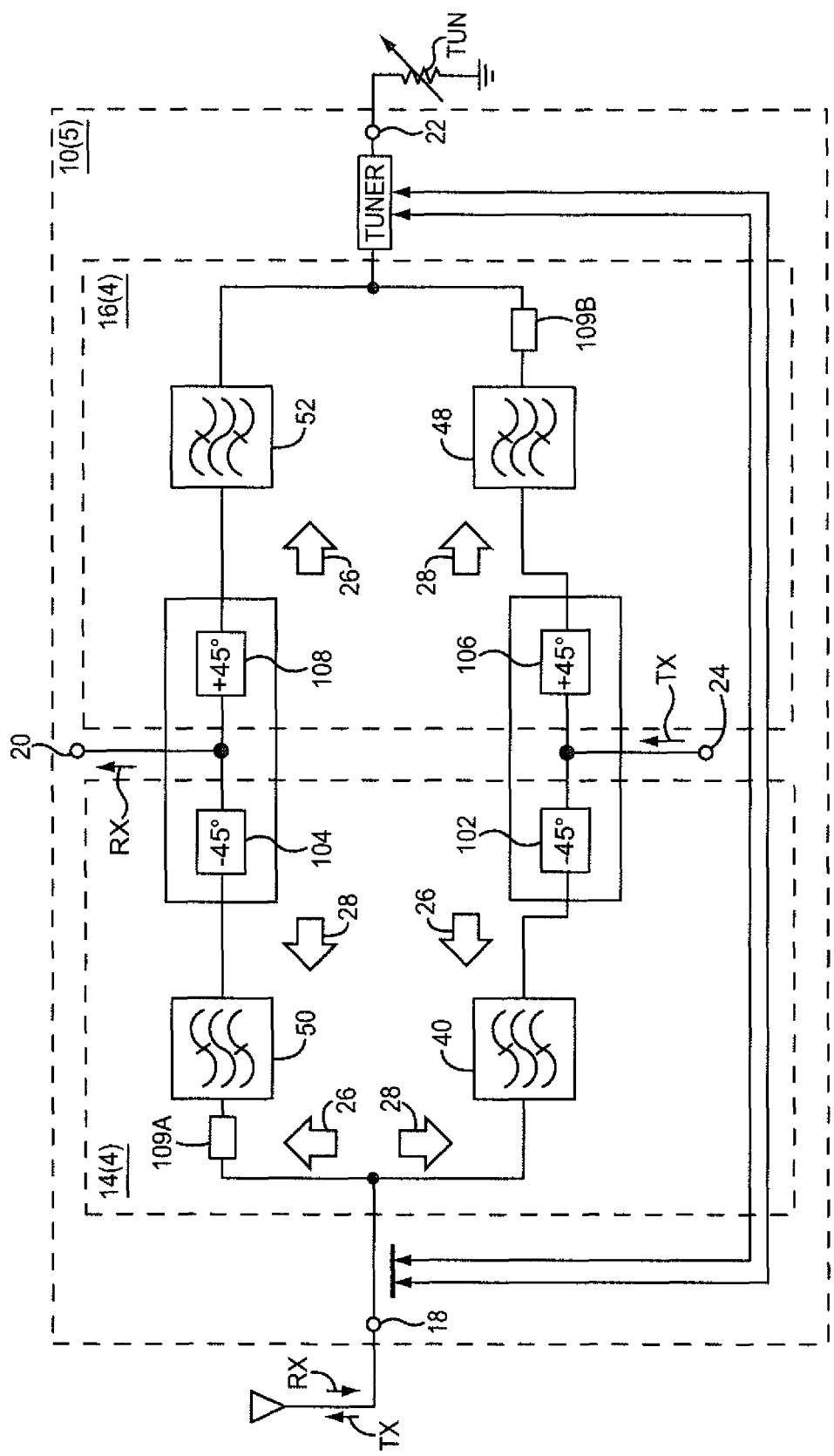

FIG. 9 illustrates another embodiment of the RF duplexing device shown in FIG. 1 that includes a first hybrid transformer and a second hybrid transformer in the first duplexer, and a third hybrid transformer and a fourth hybrid transformer in the second duplexer, where the hybrid transformers are configured so that the first phase shift provided by the first duplexer is differential with respect to the second phase shift provided by the second duplexer.

Figure 10:
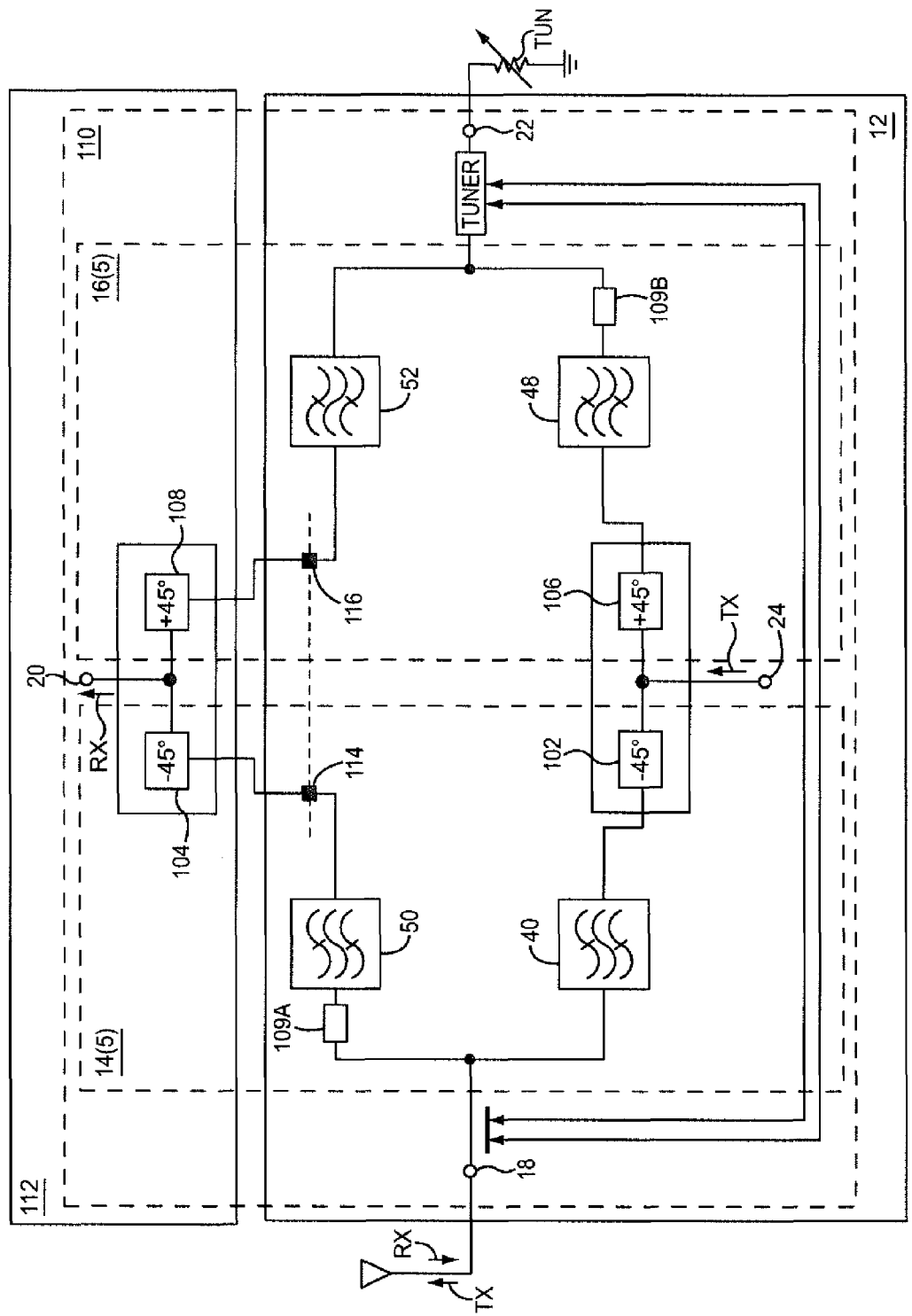

FIG. 10 is another embodiment of an RF duplexing device wherein the RF duplexing device is the same as the RF duplexing device shown in FIG. 9, except that the second hybrid transformer in the first duplexer and the fourth hybrid transformer in the second duplexer are formed on a separate semiconductor substrate.

Figure 11:
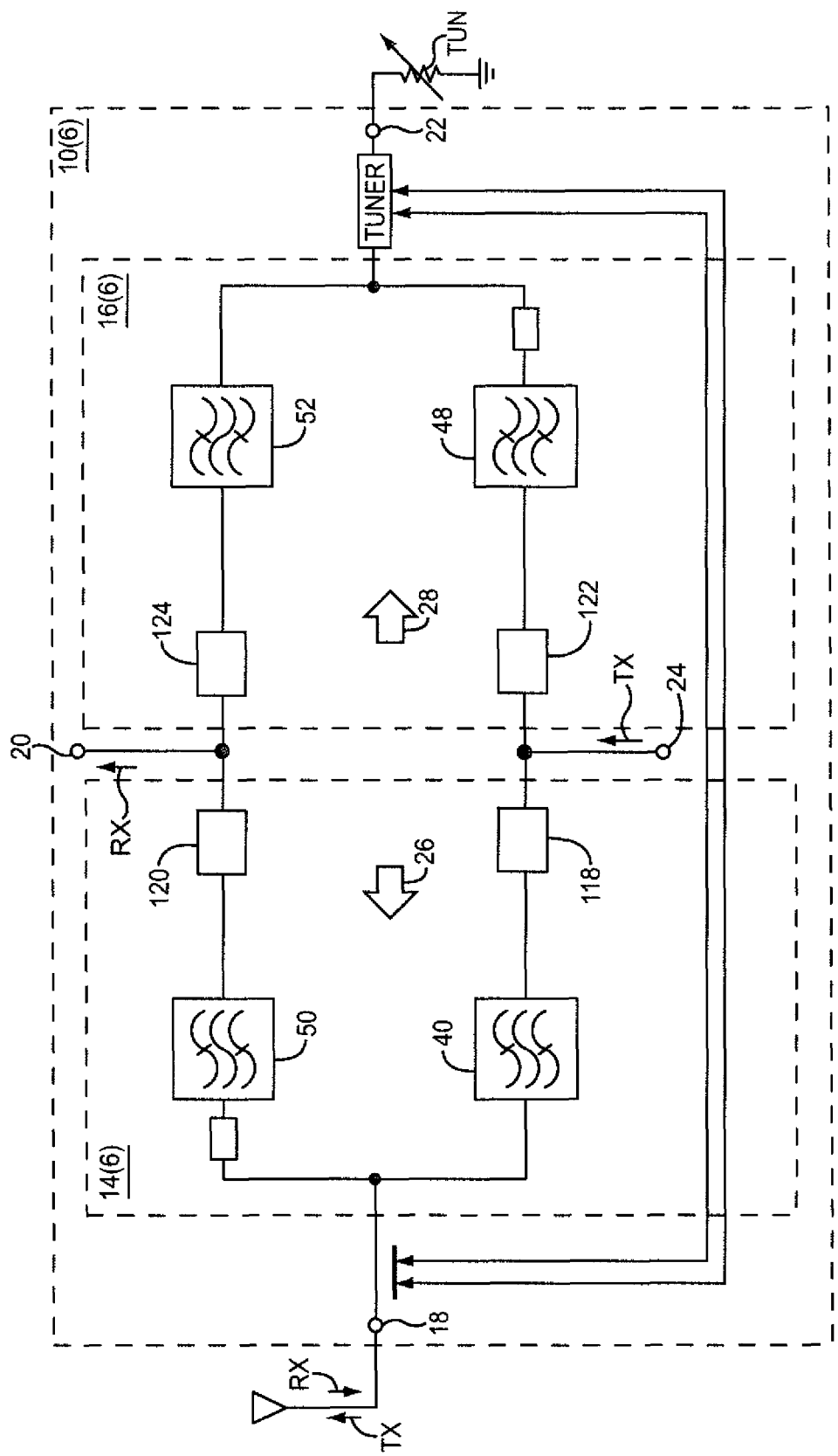

FIG. 11 is another embodiment of the RF duplexing device shown in FIG. 1, where the first duplexer includes a first transmission line phase-shifting element (TLPSE) and a second TLPSE, while the second duplexer includes a third TLPSE and a fourth TLPSE.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

This disclosure relates to radio frequency (RF) duplexing devices that increase isolation between transmission channels and receive channels without requiring significant increases in insertion losses. RF front-end modules may include one or more of the RF duplexing devices to allow for reception of RF receive signals and emission of RF transmission signals using a common antenna. The RF duplexing devices may then output the RF receive signals to downstream RF circuitry within the RF front-end module for processing, while inputting the RF transmission signals from upstream RF circuitry in the RF front-end module for emission by the common antenna. For example, an RF duplexing device may be coupled within the RF front-end module between a common antenna and one or more RF receive chains. In addition, the RF duplexing device may simultaneously be coupled within the RF front-end module between one or more RF transmission chains and the common antenna. As such, the RF duplexing device facilitates bi-directional communication using the common antenna. The RF duplexing devices disclosed herein can be designed to provide high levels of transmission-receive isolation without introducing significant insertion losses. Accordingly, the RF front-end modules can achieve better power efficiency but still comply with spectral requirements mandated by one or more RF communication standards.

FIG. 1 illustrates one embodiment of an RF duplexing device 10 formed on a semiconductor substrate 12. The RF duplexing device 10 includes a first duplexer 14, a second duplexer 16, an antenna port 18, a receive port 20, a tuning port 22, and a transmission port 24. The antenna port 18, the receive port 20, the tuning port 22, and the transmission port 24 in FIG. 1 are formed on the semiconductor substrate 12. In this embodiment, the antenna port 18, the receive port 20, the tuning port 22, and the transmission port 24 are each provided as a terminal provided on the semiconductor substrate 12. However, in other embodiments, the antenna port 18, the receive port 20, the tuning port 22, and/or the transmission port 24 may be extrinsic to the semiconductor substrate 12. For example, the antenna port 18, the receive port 20, the tuning port 22, and/or the transmission port 24 may be provided as terminals on an integrated circuit (IC) package. Furthermore, the antenna port 18, the receive port 20, the tuning port 22, and/or the transmission port 24 may be any type of waveguide component for inputting and/or outputting RF signals to or from the RF duplexing device 10. In fact, the antenna port 18, the receive port 20, the tuning port 22, and/or the transmission port 24 may not even be discrete, but rather may simply be nodes for inputting and/or outputting RF signals to or from the RF duplexing device 10.

The antenna port 18 shown in FIG. 1 is operable to simultaneously input an RF receive signal RX that operates within an RF receive band, and output an RF transmission signal TX that operates within an RF transmission band. In this manner, an antenna (not shown) may be coupled to the antenna port 18, thereby allowing for simultaneous reception of the RF receive signal RX and emission of the RF transmission signal TX by the antenna.

Reception of the RF receive signal RX may be provided by the antenna. The antenna port 18 may be coupled to receive the RF receive signal RX from the antenna. For example, the antenna port 18 may receive the RF receive signal RX directly from the antenna or through other circuitry, such as an external antenna tuner, coupled between the antenna and the antenna port 18. The RF duplexing device 10 transmits the RF receive signal RX from the antenna port 18 to the receive port 20. The receive port 20 is operable to output the RF receive signal RX. In this manner, the RF receive signal RX may be provided to external downstream RF circuitry (i.e., a receiver chain) on the semiconductor substrate 12 or on a different semiconductor substrate.

The transmission port 24 is operable to input the RF transmission signal TX. The RF transmission signal TX may be generated by upstream RF circuitry (i.e., a transmission chain) on the semiconductor substrate 12 or on a different semiconductor substrate. The transmission port 24 may be coupled to receive the RF transmission signal TX from the upstream RF circuitry. The RF duplexing device 10 is configured to transmit the RF transmission signal TX from the transmission port 24 to the antenna port 18. In this manner, the RF transmission signal TX may be emitted by the antenna.

The RF duplexing device 10 provides a high level of isolation from the transmission port 24 to the receive port 20 without introducing significant insertion losses. To do this, the RF duplexing device 10 does not rely solely on impedances to provide isolation, but rather provides increased isolation through cancellation. As shown in FIG. 1, the first duplexer 14 is coupled to the transmission port 24 and the receive port 20. The first duplexer 14 is configured to provide a first phase shift from the transmission port 24 to the receive port 20. Thus, in a signal direction 26 from the transmission port 24, the first phase shift is provided from the transmission port 24 to the receive port 20. For example, assume that an RF signal having a phase with a phase value represented by $\phi$ radians is input into the first duplexer 14 from the transmission port 24. Also, assume that the first phase shift is represented by $\Delta$ in radians. When the RF signal is transmitted through the first duplexer 14 from the transmission port 24 to the receive port 20, the phase of the RF signal is shifted by the first phase shift $\Delta$. Thus, the RF signal is output to the first duplexer 14 with the phase being shifted to a phase value $\phi+\Delta$ radians.

The second duplexer 16 is also coupled to the transmission port 24 and the receive port 20. The second duplexer 16 is configured to provide a second phase shift that is differential to the first phase shift from the transmission port 24 to the receive port 20. Accordingly, in a signal direction 28 that is the opposite of the signal direction 26, the second duplexer 16 provides the second phase shift. Since the second phase shift provided by the second duplexer 16 is differential to the first phase shift provided by the first duplexer 14, signals traveling from the transmission port 24 in the signal direction 26 and out of the first duplexer 14 toward the receive port 20 are substantially cancelled by signals traveling from the transmission port 24 in the signal direction 28 and out of the second duplexer 16 toward the receive port 20. For example, assuming again that the first phase shift of the first duplexer 14 is represented by $\Delta$ radians, the second phase shift would then be equal to about $\Delta+\pi$ radians. Alternatively, the second phase shift could equal about $\Delta-\pi$ radians. If the RF signal having the phase with a phase value represented by $\phi$ radians is transmitted through the second duplexer 16 from the transmission port 24 to the receive port 20, the RF signal is output from the second duplexer 16 with the phase being shifted approximately a phase value $\phi+\Delta+\pi$.

It should be noted that the first phase shift provided by the first duplexer 14 may have any value from 0 to $2\pi$ radians (0° to 360°), and the second phase shift provided by the second duplexer 16 may have any value from 0 to $2\pi$ radians (0° to 360°), so long as a difference between the first phase shift and the second phase shift has an absolute value of approximately $|\pi|$ radians (|180°|), or is approximately an integer multiple of $|\pi|$ radians (|180°|). This difference of approximately $|\pi|$ radians or $n^*|\pi|$ radians (where n is an integer) is what makes the second phase shift differential to the first phase shift. How close the difference between the first phase shift and the second phase shift has to be to $|\pi|$ radians (or $n^*|\pi|$ radians) may depend on design specifications, such as isolation tolerances for a particular RF application, spectral distribution techniques employed by a particular multiplexing scheme, and/or spectral requirements dictated by an RF communication standard. In the example provided above, the difference between the first phase shift and the second phase shift is $\Delta+\pi-\Delta$, which is equal to $\pi$ radians.

The RF duplexing device 10 shown in FIG. 1 can be manufactured to meet the requirements of a wide variety of multiplexing schemes and RF communication standards. For example, the RF receive signal RX and the RF transmission signal TX may be encoded using time division multiplexing (TDM), frequency division multiplexing (FDM), space division multiplexing (SDM), code division multiple access multiplexing (CDMA), orthogonal frequency division multiple access multiplexing (OFDMA), and/or the like. Additionally, the RF duplexing device 10 may be configured to provide duplexing for various RF communication standards. For example, the RF receive signal RX and the RF transmission signal TX may be formatted in accordance with 2G Global System for Mobile Communications (GSM) standards, 3G standards, 4G Long Term Evolution (LTE) standards, and/or the like. Furthermore, the RF duplexing device 10 may provide duplexing for various specifications within these RF communication standards, along with their RF communication bands. For instance, the RF transmission signal TX and the RF receive signal RX may be formatted in accordance with and in RF communication bands defined by specifications of the 2G GSM standard, such as a Digital Communication System (DCS) specification, a Personal Communications Service (PCS) specification, a GSM-850 specification, and a GSM-900 specification; specifications within the 3G standard, such as an Enhanced Data Rates for GSM Evolution (EDGE)-850 specification, an EDGE-950 specification, an EDGE-1800 specification, and an EDGE-1900 specification; and specifications within the 4G LTE standard, such as a Mobile Device Management (MDM) specification, a High Speed Packet Access (HSPA) specification, a Multiple-Input and Multiple-Output (MIMO) specification, and/or the like.

Referring again to FIG. 1, the antenna port 18 of the RF duplexing device 10 is coupled to the first duplexer 14. In order to avoid, minimize, or reduce reflections of the RF transmission signal TX at the antenna port 18, an impedance as seen by the RF duplexing device 10 into the antenna port 18 should match an impedance of the RF duplexing device 10 as seen externally from the antenna port 18. The tuning port 22 is coupled to the second duplexer 16 so that a tuner (not shown) can be coupled to the tuning port 22 in order to provide matching at the antenna port 18. By coupling the tuning port 22 with the second duplexer 16, and coupling the antenna port 18 with the first duplexer 14, the RF duplexing device 10 is designed to eliminate, or at least reduce, insertion losses at the tuning port 22.

As shown in FIG. 1, the RF duplexing device 10 may input the RF transmission signal TX and spurious transmission noise emissions STXNE outside the RF transmission band of the RF transmission signal TX at the transmission port 24. As seen at the transmission port 24, the first duplexer 14 shown in FIG. 1 is configured to block the RF receive band of the RF receive signal RX but allow for RF bands outside of the RF receive band to pass, including the RF transmission band. On the other hand, as seen at the transmission port 24, the second duplexer 16 shown in FIG. 1 is configured to block the RF transmission band of the RF transmission signal TX but allow for bands outside of the RF transmission band to pass, including the RF receive band. As a result, the spurious transmission noise emissions STXNE are split into a first hybrid noise signal 30, a second hybrid noise signal 32, and a third hybrid noise signal 34. The first hybrid noise signal 30 is outside both the RF transmission band and the RF receive band, and is directed to be received by the first duplexer 14. The first hybrid noise signal 30 thus propagates in the signal direction 26. The second hybrid noise signal 32 is also outside of both the RF transmission band and the RF receive band, and is directed in the signal direction 28 to be received by the second duplexer 16. The second hybrid noise signal 32 thus propagates in the signal direction 28. The third hybrid noise signal 34 is within the RF receive band of the RF receive signal RX and is also directed in the signal direction 28 to be received by the second duplexer 16. The third hybrid noise signal 34 thus propagates in the signal direction 28.

A tuner (not shown) may be coupled to the tuning port 22 to filter the third hybrid noise signal 34. For example, the tuner may have a frequency response that defines a passband and may be tunable to provide the passband within the RF receive band. As such, the third hybrid noise signal 34 within the RF receive band is transmitted out of the RF duplexing device 10 so as to not interfere with the RF receive signal RX. The first hybrid noise signal 30 is output from the first duplexer 14 (in the signal direction 26) toward the receive port 20, while the second hybrid noise signal 32 is output from the second duplexer 16 (in the signal direction 28) toward the receive port 20. However, as mentioned above, the first duplexer 14 provides the first phase shift from the transmission port 24 to the receive port 20, and the second duplexer 16 provides the second phase shift from the transmission port 24 to the receive port 20. Since the first phase shift and the second phase shift are differential, the phase of the first hybrid noise signal 30 has a phase difference of approximately $\pi$ radians (180°) with respect to the phase of the second hybrid noise signal 32. As a result, the first hybrid noise signal 30 and the second hybrid noise signal 32 cancel at the receive port 20.

The first duplexer 14 is configured to transmit the RF transmission signal TX from the transmission port 24 to the antenna port 18. Note that the second duplexer 16 blocks the RF receive band, as seen from the transmission port 24. Thus, the RF transmission signal TX is transmitted entirely or almost entirely in the signal direction 26 and into the first duplexer 14. Therefore, none (or only a small amount) of the power in the RF transmission band is dissipated through the tuner coupled to the tuning port 22. Accordingly, the RF duplexing device 10 avoids a 3 dB insertion loss at the tuning port 22, while providing a significant amount of isolation from the transmission port 24 to the receive port 20.

FIG. 2 illustrates an exemplary RF duplexing device 10(1). The exemplary RF duplexing device 10(1) is an embodiment of the RF duplexing device 10 illustrated in FIG. 1. The antenna port 18 is coupled to an external antenna ANT for simultaneous reception and emission of the RF receive signal RX and the RF transmission signal TX, respectively. The tuning port 22 is coupled to an external tuner TUN. In this embodiment, a first duplexer 14(1) includes a non-inverting transformer 36 coupled to the transmission port 24. A phase shift from the input to the output of the non-inverting transformer 36 may be represented as $\tau$ radians. A second duplexer 16(1) includes an inverting transformer 38 coupled to the transmission port 24. The inverting transformer 38 is thus configured to provide a polarity inversion. Assuming that the inverting transformer 38 and the non-inverting transformer 36 have the same or similar electromagnetic characteristics, a phase shift from the input to the output of the inverting transformer 38 may equal $\tau+\pi$ radians.

In this embodiment, the first duplexer 14(1) provides a phase shift of $\beta$ radians from an output of the non-inverting transformer 36 to the receive port 20. The second duplexer 16(1) provides the same phase shift of $\beta$ radians from the output of the inverting transformer 38 to the receive port 20. Accordingly, the first phase shift (represented as $\Delta$) of the first duplexer 14(1) in the signal direction 26 from the transmission port 24 to the receive port 20 is $\Delta=\tau+\beta$ radians while the second phase shift (represented as $\theta$) of the second duplexer 16(1) in the signal direction 28 from the transmission port 24 to the receive port 20 is $\theta=\tau+\pi+\beta$ radians. As such, the second phase shift $\theta$ is differential to the first phase shift $\Delta$ because a phase difference between the first phase shift $\Delta$ and the second phase shift $\theta$ is $|\theta-\Delta|=\pi$ radians. The polarity inversion of the inverting transformer 38 is thus provided such that the second phase shift $\theta$ is differential to the first phase shift $\Delta$.

Referring again to FIG. 2, the first duplexer 14(1) includes a first RF filter 40 coupled between the transmission port 24 and the antenna port 18. More specifically, in this embodiment, the non-inverting transformer 36 includes a primary winding 42 coupled to the transmission port 24 and a secondary winding 44 coupled to the first RF filter 40. The first RF filter 40 has a first frequency response defining a first stopband that blocks the RF receive band of the RF receive signal RX. The primary winding 42 is coupled to the transmission port 24, while the secondary winding 44 is coupled to the first RF filter 40. As such, the RF receive band is blocked in the signal direction 26 from the transmission port 24 toward the first duplexer 14(1). The inverting transformer 38 in the second duplexer 16(1) includes a primary winding 46 coupled to the transmission port 24 and a secondary winding 47 coupled to a second RF filter 48. The second RF filter 48 is coupled between the transmission port 24 and the tuning port 22 to prevent the RF transmission signal TX from being transmitted in the signal direction 28 towards the second duplexer 16(1). More specifically, the second RF filter 48 has a second frequency response defining a second stopband that blocks an RF transmission band of the RF transmission signal TX. However, as explained in further detail below, the input impedance into the first duplexer 14(1) and the input impedance into the second duplexer 16(1) outside both the RF transmission band and the RF receive band may be approximately equal.

Since the first RF filter 40 is configured to pass the RF transmission band and the second stopband of the second RF filter 48 blocks the RF transmission band, the RF transmission signal TX operating within the RF transmission band is passed almost entirely in the signal direction 26 and through the first RF filter 40. In contrast, since the second RF filter 48 is configured to pass the RF receive band and the first stopband of the first RF filter 40 blocks the RF receive band, the third hybrid noise signal 34 within the RF receive band is passed almost entirely in the signal direction 28 through the second RF filter 48 in the second duplexer 16(1).

The first duplexer 14(1) is also configured to pass the RF transmission signal TX from the transmission port 24 to the antenna port 18. The first duplexer 14(1) also includes a third RF filter 50 coupled between the antenna port 18 and the receive port 20. The third RF filter 50 has a third frequency response defining a third stopband that blocks the RF transmission band. Accordingly, the RF transmission signal TX is blocked from passing to the receive port 20. The antenna port 18 is operable to output the RF transmission signal TX, which is emitted by the antenna ANT. In this embodiment, the third RF filter 50 within the first duplexer 14(1) is identical to the second RF filter 48 within the second duplexer 16(1).

The second duplexer 16(1) includes a fourth RF filter 52 coupled between the tuning port 22 and the receive port 20. The fourth RF filter 52 thus has a fourth frequency response defining a fourth stopband that block the RF receive band of the RF receive signal RX. In this embodiment, the fourth RF filter 52 within the second duplexer 16(1) is identical to the first RF filter 40 within the first duplexer 14(1). As a result, outside of both the RF transmission band and the RF receive band, the spurious transmission noise emissions STNXE at the transmission port 24 see approximately an equal impedance from the transmission port 24 to the first duplexer 14(1) and from the transmission port 24 to the second duplexer 16(1).

In the embodiment shown in FIG. 2, the first RF filter 40, the second RF filter 48, the third RF filter 50, and the fourth RF filter 52 are each symmetrical, and therefore have the same frequency response in the signal direction 26 and the signal direction 28. The first frequency response of the first RF filter 40 thus defines the first stopband from the transmission port 24 to the antenna port 18 and from the antenna port 18 to the transmission port 24. The second frequency response of the second RF filter 48 thus defines the second stopband from the transmission port 24 to the tuning port 22 and from the tuning port 22 to the transmission port 24. The third frequency response of the third RF filter 50 thus defines the third stopband from the antenna port 18 to the receive port 20 and from the receive port 20 to the antenna port 18. The fourth frequency response of the fourth RF filter 52 thus defines the fourth stopband from the tuning port 22 to the receive port 20 and from the receive port 20 to the tuning port 22. As such, the receive band of the RF receive signal RX is blocked from the tuning port 22 to the receive port 20 and the third hybrid noise signal 34 within the receive band is dissipated at the tuner TUN. As such, the transmission noise within the RF receive band has very little effect on the RF receive signal RX at the receive port 20. Similarly, the third RF filter 50 blocks the RF transmission band and prevents the RF transmission signal TX from looping back through the second duplexer 16(1) to the transmission port 24 or the tuning port 22. Accordingly, the RF transmission signal TX is output through the antenna port 18 almost entirely to the antenna ANT, which emits the transmission signal TX to a distant antenna to establish communications with base stations or other RF front-end modules. Isolation from the transmission port 24 and the receive port 20 is provided outside of the receive band of the RF receive signal RX and the RF transmission band of the RF transmission signal TX by the first phase shift and the second phase shift. As explained above, since the first phase shift and the second phase shift are differential to one another, the first hybrid noise signal 30 and the second hybrid noise signal 32 cancel at the receive port 20.

The second duplexer 16(1) is also transposed with respect to the first duplexer 14(1). The RF duplexing device 10(1) thus provides isolation both from the transmission port 24 to the receive port 20 and from the receive port 20 to the transmission port 24. As mentioned above, the first RF filter 40, the second RF filter 48, the third RF filter 50, and the fourth RF filter 52 are each symmetrical. Furthermore, the first RF filter 40 is identical to the fourth RF filter 52, and the second RF filter 48 is identical to the third RF filter 50. Thus, the first duplexer 14(1) also provides the first phase shift in the signal direction 28 from the receive port 20 to the transmission port 24, while the second duplexer 16(1) provides the second phase shift in the signal direction 26 from the receive port 20 to the transmission port 24. Therefore, any noise outside of both the RF transmission band and the RF receive band that is input at the receive port 20 cancels at the transmission port 24. Furthermore, any noise within the RF transmission band input into the receive port 20 is blocked by the third RF filter 50 and passed by the fourth RF filter 52. Since the second RF filter 48 blocks the RF transmission band, the tuner TUN may also be configured to filter the noise within the RF transmission band from the receive port 20.

Figure 3:
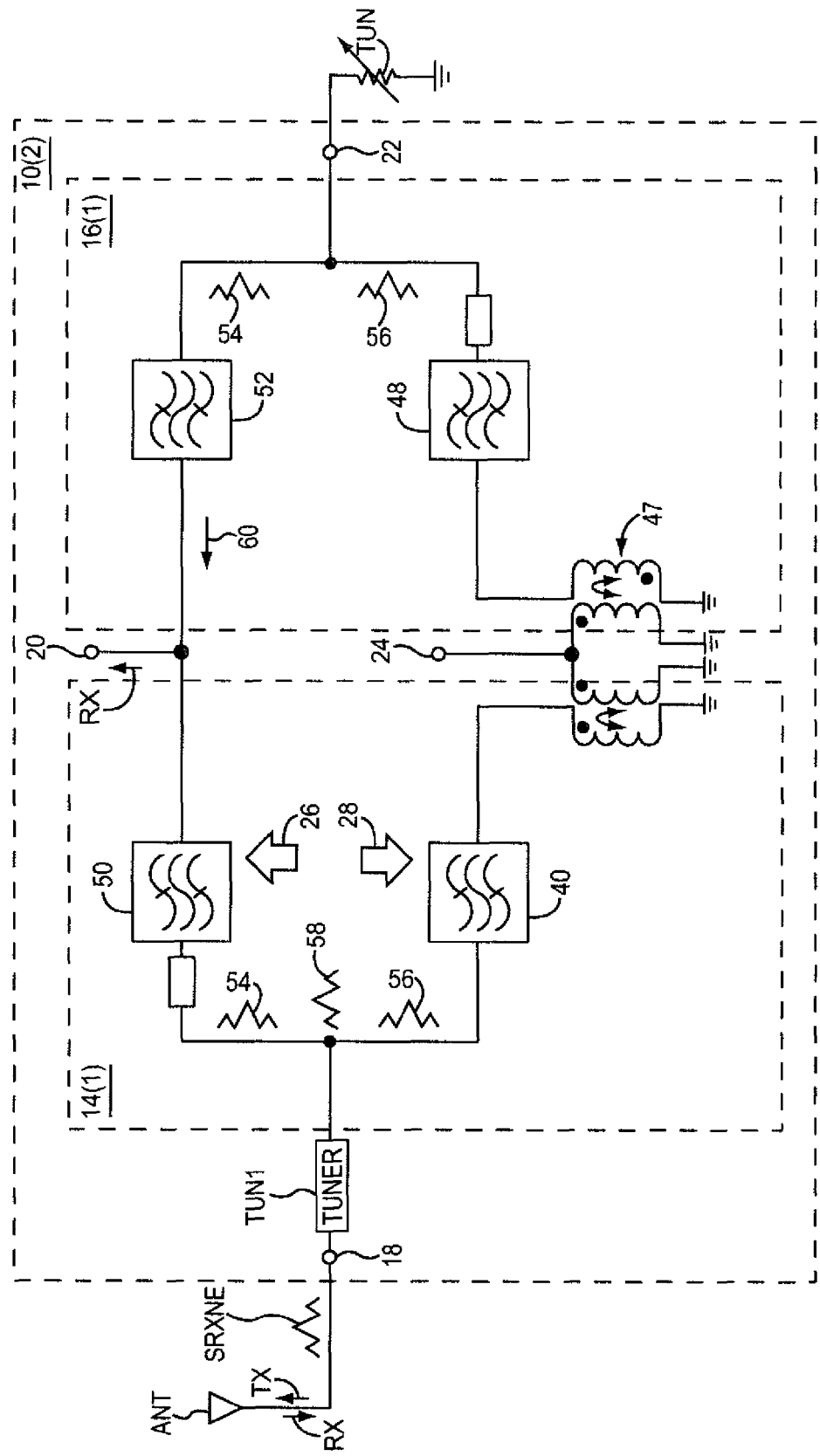
FIG. 3 illustrates another embodiment of the RF duplexing device shown in FIG. 1 having the non-inverting transformer and the inverting transformer of FIG. 2 and a tuner coupled to an antenna port.

FIG. 3 illustrates another embodiment of an RF duplexing device 10(2). The RF duplexing device 10(2) is the same as the RF duplexing device 10(1) described above with regard to FIG. 2, except that the RF duplexing device 10(2) includes a tuner TUN1 coupled to the antenna port 18. More specifically, the RF duplexing device 10(2) includes the first duplexer 14(1) and the second duplexer 16(1) described above with respect to FIG. 2. The tuner TUN1 is coupled between the antenna port 18 and the first duplexer 14(1). The antenna port 18 may be operable to input the RF receive signal RX operating within the RF receive band and spurious receive noise emissions SRXNE outside of the RF receive band. The first duplexer 14(1) and the second duplexer 16(2) are operably associated to split the spurious receive noise emissions SRXNE into a first hybrid noise signal 54 outside both the RF transmission band and the RF receive band, a second hybrid noise signal 56 outside both the RF transmission band and the RF receive band, and a third hybrid noise signal 58 within the RF transmission band. The third stopband of the third RF filter 50 and the second stopband of the second RF filter 48 block the RF transmission band both in the signal direction 26 and the signal direction 28. As such, the third hybrid noise signal 58 is reflected back towards the tuner TUN1. The tuner TUN1 is configured to filter the third hybrid noise signal within the RF transmission band when the third hybrid noise signal 58 is reflected back to the tuner TUN1. As such, receive noise within the RF transmission band is isolated from the antenna port 18, the receive port 20, the transmission port 24, and the tuning port 22.

The first duplexer 14(1) and the second duplexer 16(1) are configured to provide a third phase shift from the antenna port 18 to the tuning port 22 in the signal direction 26. In addition, the first duplexer 14(1) and the second duplexer 16(1) are configured to provide a fourth phase shift from the antenna port 18 to the tuning port 22 in the signal direction 28. The fourth phase shift is differential with respect to the third phase shift, which results in the antenna port 18 seeing a very high impedance to the tuning port 22 so that the impedance of the tuner TUN at the tuning port 22 has very little or no impact on the antenna port 18 with respect to the receive band of the RF receive signal RX. Furthermore, the first hybrid noise signal 54 and the second hybrid noise signal 56 substantially cancel at the tuning port 22, since the fourth phase shift is differential to the third phase shift from the antenna port 18 to the tuning port 22.

In this embodiment, the third phase shift in the signal direction 26 from the antenna port 18 to the tuning port 22 is substantially equal to the first phase shift from the transmission port 24 to the receive port 20. Additionally, the fourth phase shift in the signal direction 28 from the antenna port 18 to the tuning port 22 is substantially equal to the second phase shift from the transmission port 24 to the receive port 20. The inverting transformer 38 provides the polarity inversion so that the third phase shift in the signal direction 26 and the fourth phase shift in the signal direction 28 from the antenna port 18 are differential with respect to one another. While the third RF filter 50 and the second RF filter 48 are configured to pass the RF receive band, the first stopband of the first RF filter 40 and the fourth stopband of the fourth RF filter 52 block the RF receive band, and thus prevent the RF receive signal RX within the RF receive band from passing to either the transmission port 24 or the tuning port 22. In this manner, the receive port 20 outputs the RF receive signal RX operating within the RF receive band. Furthermore, the tuner TUN1 reduces or prevents receive noise from passing to the receive port 20 since any receive noise at the receive port 20 is reduced or cancelled by a compensation signal 60 generated from the tuning port 22 to the receive port 20. While the tuner TUN1 introduces insertion losses on the antenna port 18, the tuner TUN1 allows for antenna mismatch compensation and can be used for duplexer matching if needed.

Figure 4:
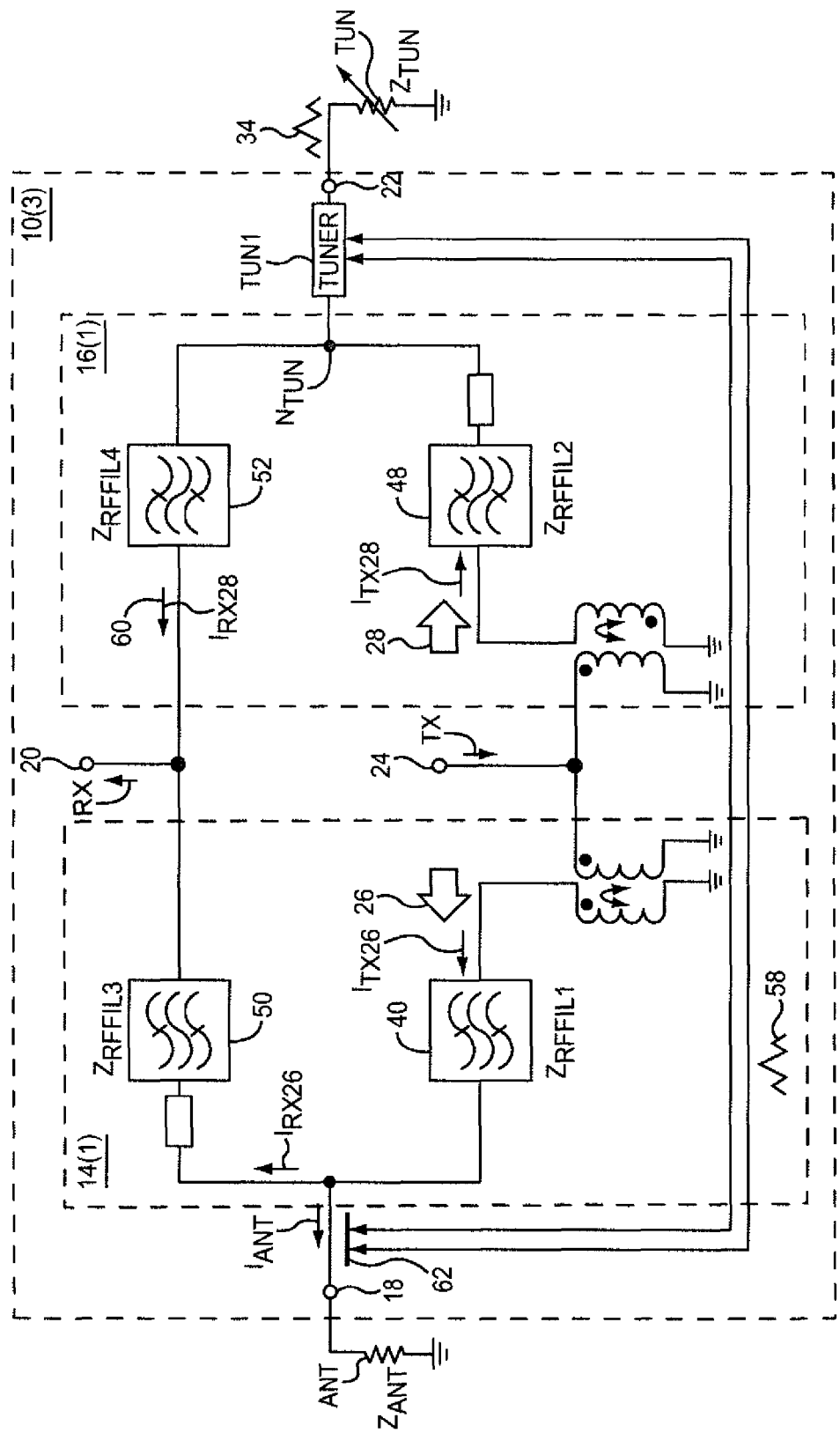
FIG. 4 illustrates yet another embodiment of the RF duplexing device shown in FIG. 1, where, unlike in FIG. 3, a tuner is coupled to a tuning port rather than the antenna port.

FIG. 4 illustrates another embodiment of an RF duplexing device 10(3). The RF duplexing device 10(3) is the same as the RF duplexing device 10(2) described above with regard to FIG. 3, except for the location of the tuner TUN1. In addition, the RF duplexing device 10(3) includes a bidirectional coupler 62. The RF duplexing device 10(3) includes the first duplexer 14(1) and the second duplexer 16(1) described above with regard to FIGS. 2 and 3. However, in this embodiment, the tuner TUN1 is coupled between the second duplexer 16(1) and the tuning port 22. Furthermore, the bidirectional coupler 62 is coupled between the antenna port 18 and the first duplexer 14(1). In this manner, insertion losses of the tuner TUN1 are not introduced at the antenna port 18. The bidirectional coupler 62 thus provides a path for the third hybrid noise signal 58 within the transmission band to the tuner TUN1, while being configured along with the tuner TUN to match an antenna impedance $Z_{ANT}$ as seen from the antenna port 18 by the RF duplexing device 10(3) to the impedance seen by the antenna ANT into the RF duplexing device 10(3) at the antenna port 18. The bidirectional coupler 62 may be operably associated with the tuner TUN1 such that an impedance of the tuner TUN1 is adjustable through the bidirectional coupler 62. As such, the tuner TUN1 may be used to provide impedance adjustments in accordance with a Voltage Standing Wave Ratio (VSWR).

In this embodiment, the tuner TUN1 is operably associated with the tuner TUN. More specifically, the tuner TUN1 and the tuner TUN are both coupled to the tuning port 22. The tuner TUN1 may operate with the tuner TUN. In this manner, the tuner TUN1 can be relatively small (at least in comparison to the tuner TUN). The tuner TUN is configured to prevent high power transmissions to the tuner TUN1. As shown in FIG. 4, the tuner TUN1 is operably associated with the tuner TUN so that the tuner TUN1 does not need to handle high power transmission signals.

Figure 5A:
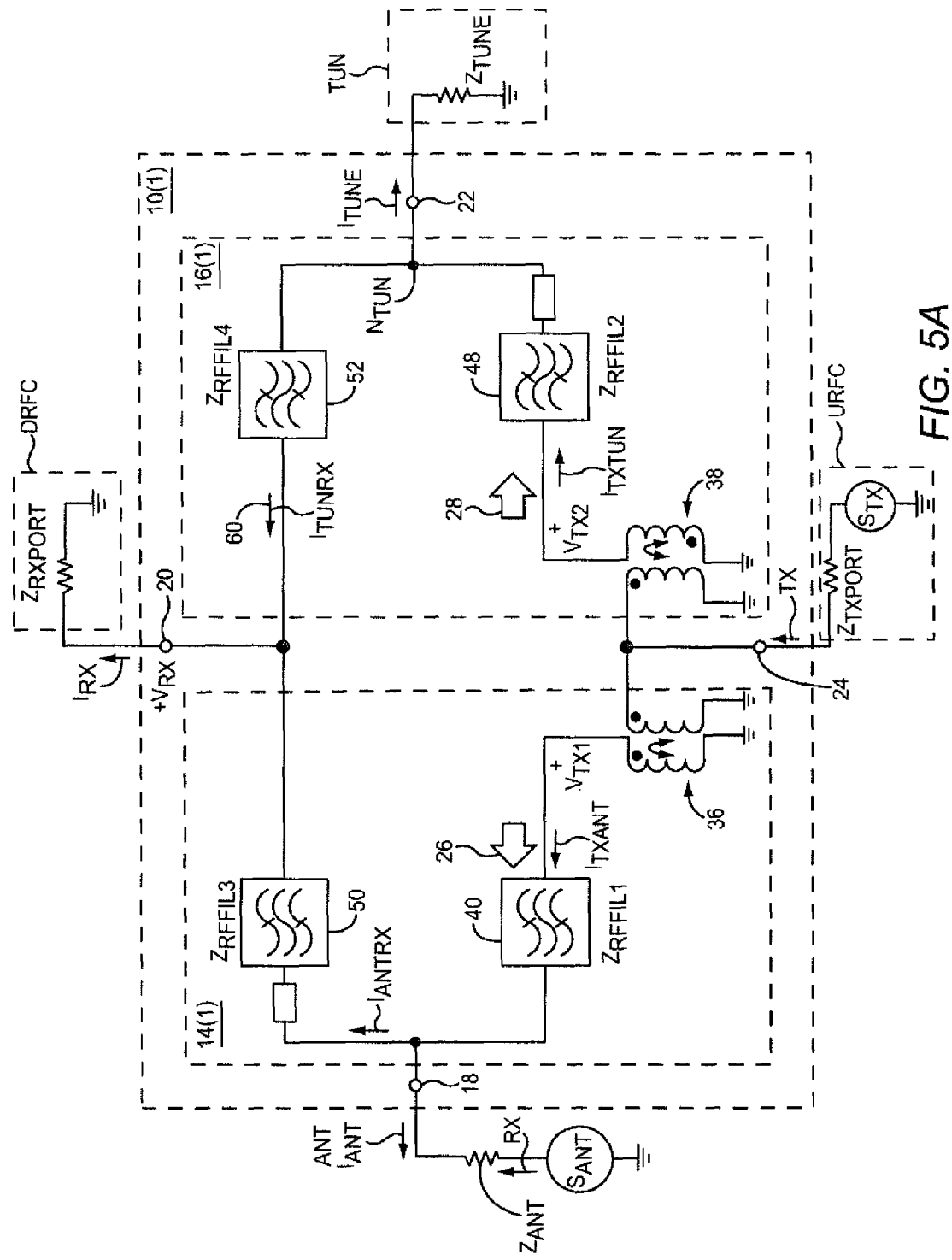
FIG. 5A illustrates the embodiment of the RF duplexing device shown in FIG. 2 with an antenna coupled to an antenna port, downstream RF circuitry coupled to the receive port, a tuner coupled to a tuning port, and upstream RF circuitry coupled to the transmission port.

FIG. 5A illustrates the RF duplexing device 10(1) shown in FIG. 2. In FIG. 5A, the antenna port 18 is coupled to the antenna ANT, which is modeled by the antenna impedance $Z_{ANT}$ and a source $S_{ANT}$. The receive port 20 is coupled to downstream RF circuitry DRFC, which may, for example, be an RF receive chain. The downstream RF circuitry DRFC is modeled by an impedance $Z_{RXPORT}$. The tuning port 22 is coupled to the tuner TUN and is modeled by an impedance $Z_{TUNE}$. The tuner TUN is tunable and thus the impedance $Z_{TUNE}$ can be varied. Upstream RF circuitry URFC is coupled to the transmission port 24. The upstream RF circuitry URFC is configured to generate the RF transmission signal TX and is modeled by an impedance $Z_{TXPORT}$ and a source $S_{TX}$. In response to the RF transmission signal TX at the transmission port 24, a current $I_{TXANT}$ and a voltage $V_{TX1}$ are provided at the output of the non-inverting transformer 36. The current $I_{TXANT}$ propagates in the signal direction 26 from the transmission port 24 to the antenna port 18. The first RF filter 40 has an impedance $Z_{RFFIL1}$. The antenna port 18 is configured to output a current $I_{ANT}$ to the antenna ANT. The source $S_{ANT}$ is used in order to model excitations on the antenna ANT resulting from the reception of the RF receive signal RX along with the spurious receive noise emissions SRXNE. The current $I_{ANT}$ results from the RF receive signal RX, the spurious receive noise emissions SRXNE, and the RF transmission signal TX in whatever form it takes at the antenna port 18, along with any other signal that may or may not be propagating through the antenna port 18.

A current $I_{TXTUN}$ and a voltage $V_{TX2}$ are provided at the output of the inverting transformer 38 in response to the RF transmission signal TX at the transmission port 24 (and the spurious transmission noise emissions STXNE from the upstream RF circuitry URFC). The current $I_{TXTUN}$ propagates in the signal direction 28 from the transmission port 24 to the tuning port 22. The second RF filter 48 has an impedance $Z_{RFFIL2}$. The tuning port 22 is configured to output a current $I_{TUNE}$ to the tuner TUN.

A current $I_{ANTRX}$ and the compensation signal 60 are provided in response to the RF receive signal RX and the spurious receive noise emissions SRXNE at the antenna port 18, the RF transmission signal TX and the spurious transmission noise emissions STXNE at the transmission port 24. The current $I_{ANTRX}$ propagates in the signal direction 26 from the antenna port 18 to the receive port 20. The third RF filter 50 has an impedance $Z_{RFFIL3}$. The compensation signal 60 has a current $I_{TUNRX}$, which propagates in the signal direction 28 from the tuning port 22 to the receive port 20. The fourth RF filter 52 has an impedance $Z_{RFFIL4}$. The tuning port 22 is configured to output the tuner current $I_{TUNE}$ to the tuner TUN. The current $I_{TUNRX}$ can therefore be provided as a part of the current $I_{TXTUN}$ that does not pass to the tuning port 22. There is a voltage $V_{RX}$ and a current $I_{RX}$ at the receive port 20.

Below are the circuit equations for the RF duplexing device 10(1) shown in FIG. 5A with regard to the RF transmission signal TX. Accordingly, for the circuit equations below it is assumed that the RF receive signal RX is not being received by the antenna ANT (modeled by shorting and turning off the source $S_{ANT}$). In this case, the circuit equations are:

$I_{TXANT} = I_{ANT} + I_{ANTRX}$ $I_{TXTUN} = I_{TUNE} + I_{TUNRX}$ $V_{TX1} = Z_{RFFIL1} * I_{TXANT} + Z_{ANT} * I_{ANT}$ $V_{TX2} = Z_{RFFIL2} * I_{TXTUN} + Z_{TUNE} * I_{TUNE}$ $Z_{ANT} * I_{ANT} = Z_{RFFIL3} * I_{ANTRX} + V_{RX}$ $Z_{TUNE} * I_{TUNE} = Z_{RFFIL4} * I_{TUNRX} + V_{RX}$

Assuming that both the non-inverting transformer 36 and the inverting transformer 38 have identical electromagnetic characteristics and turns ratios of 1:1, we can derive:

$V_{TX2} = -V_{TX1}$ $D = [(Z_{RFFIL3} + Z_{ANT}) * (Z_{RFFIL1} + Z_{ANT}) - Z_{ANT}^2]$ $D_c = [(Z_{RFFIL2} + Z_{TUNE}) * (Z_{RFFIL4} + Z_{TUNE}) - Z_{TUNE}^2]$ $I_{TXANT} = V_{TX1} * (Z_{ANT} + Z_{RFFIL3})/D - V_{rx} * Z_{ANT}/D$ $I_{ANTRX} = -V_{TX1} * Z_{ANT}/D - V_{RX} * (Z_{ANT} + Z_{RFFIL1})/D$ $I_{TXTUN} = -V_{TX1} * (Z_{TUNE} + Z_{RFFIL4})/D_c$ $I_{TUNRX} = -V_{TX1} * Z_{TUNE}/D_c - V_{RX} * (Z_{TUNE} + Z_{RFFIL2})/D_c$ $I_{ANT} = V_{TX1} * Z_{RFFIL3}/D + V_{RX} * Z_{RFFIL1}/D$ $I_{TUNE} = V_{TX2} * Z_{RFFIL4}/D_c + V_{rx} * Z_{RFFIL2}/D_c$ $I_{RX} = V_{rx} * (Z_{ANT}/D - Z_{TUNE}/D_c)/(1 + Z_{RXPORT} * (Z_{ANT} + Z_{RFFIL1})/D + Z_{RXPORT} * (Z_{TUNE} + Z_{RFFIL2})/D_c)$

If we assume $Z_{TUNE} = Z_{ANT}$, $Z_{RFFIL2} = Z_{RFFIL3}$ and $Z_{RFFIL4} = Z_{RFFIL1}$, perfect matching:

$D = D_c$ $I_{RX} = 0$ $I_{ANT} = V_{TX1} * Z_{RFFIL3}/D$ $I_{TUNE} = -V_{TX1} * Z_{RFFIL1}/D$

Note that any excitation of the transmission port 24 gets cancelled at the receive port 20 so that $I_{RX} = 0$. Furthermore, the impedance $Z_{RFFIL1}$ (and also impedance $Z_{RFFIL4}$) approximately equals 0 within the RF transmission band and thus $I_{TUNE}$ is approximately equal 0 within the RF transmission band. Thus, RF transmission signal TX does not dissipate power at the tuning port 22 and the RF duplexing device 10(1) avoids a 3 dB power loss. Rather, only noise within the RF receive band is dissipated through the tuner TUN. Noise outside of both the RF receive band and the RF transmission band cancels at the receive port 20, since $I_{RX} = 0$. Also, since D approximately equals $Z_{RFFIL3} * Z_{ANT}$ within the RF transmission band, the current $I_{ANT}$ approximately equals $V_{TX1}/Z_{ANT}$, which indicates that approximately all of the power of the RF transmission signal TX within the RF transmission band is transferred to the antenna ANT.

Below are the circuit equations for the RF duplexing device 10(1) shown in FIG. 5A with regard to the RF receive signal RX. Accordingly, for the circuit equations below it is assumed that the RF transmission signal TX is not being generated by the upstream RF circuitry URFC (modeled by shorting and turning off the source $S_{TX}$). In this case, the excitation of the antenna ANT by the RF receive signal RX is modeled as a voltage erxload generated by the source $S_{RX}$. Assuming that both the non-inverting transformer 36 and the inverting transformer 38 have identical electromagnetic characteristics and turns ratios of 1:1, we can derive:

$$I_{TXANT} = I_{ANT} + I_{ANTRX}$$

$$I_{TXTUN} = I_{TUNE} + I_{TUNRX}$$

$$V_{TX1} = Z_{RFFIL1} * I_{TXANT} + erx\text{load} + Z_{ANT} * I_{ANT}$$

$$V_{RX} = -Z_{RFFIL3} * I_{ANTRX} + erx\text{load} + Z_{ANT} * I_{ANT}$$

$$-V_{TX1} = Z_{RFFIL2} * I_{TXTUN} + Z_{TUNE} * I_{TUNE}$$

$$V_{RX}1 = -Z_{RFFIL4} * I_{TUNRX} + Z_{TUNE} * I_{TUNE}$$

$$V_{RX} = Z_{RXPORT} * (I_{ANTRX} + I_{TUNRX})$$

$$V_{TX1} = -Z_{TXPORT} * (I_{TXANT} - I_{TXTUN})$$

Then we have:

$$I_{ANTRX} = (V_{TX} * Z_{ANT} - V_{rx} * (Z_{RFFIL1} + Z_{ANT}) + erx\text{load} * Z_{RFFIL1})/D$$

$$I_{TXANT} = (V_{TX} * (Z_{RFFIL3} + Z_{ANT}) - V_{RX} * Z_{ANT} - erx\text{load} * Z_{RFFIL3})/D$$

$$I_{TUNRX} = (-V_{TX} * Z_{TUNE} - V_{RX} * (Z_{RFFIL2} + Z_{TUNE}))/D_c$$

$$I_{TXTUN} = (-V_{TX} * (Z_{RFFIL4} + Z_{TUNE}) - V_{RX} * Z_{TUNE})/D_c$$

Assuming perfect matching case (i.e., $Z_{TUNE} = Z_{ANT}$, $Z_{RFFIL2} = Z_{RFFIL3}$, $Z_{RFFIL4} = Z_{RFFIL1}$), we can derive that:

$$V_{RX} = Z_{RXPORT} * erx\text{port}/(Z_{ANT} + Z_{RXPORT}) * 1/[(Z_{RFFIL3}/(Z_{RXPORT} + Z_{ANT}) + 1 + Z_{RFFIL3}/Z_{RFFIL1} + 2 * Z_{RXPORT} * Z_{ANT}/(Z_{ANT} + Z_{RXPORT})/Z_{RFFIL1})]$$

If $Z_{RFFIL1}$ is assumed to be infinite within the RF receive band, then the $V_{RX}$ at the receive port 20 is approximately equal to $Z_{RXPORT}/(Z_{ANT} + Z_{RXPORT}) * erx\text{load}$. This indicates that the RF receive signal RX within the RF receive band is transmitted to the receive port 20 and is isolated from the transmission port 24.

Figure 5B:
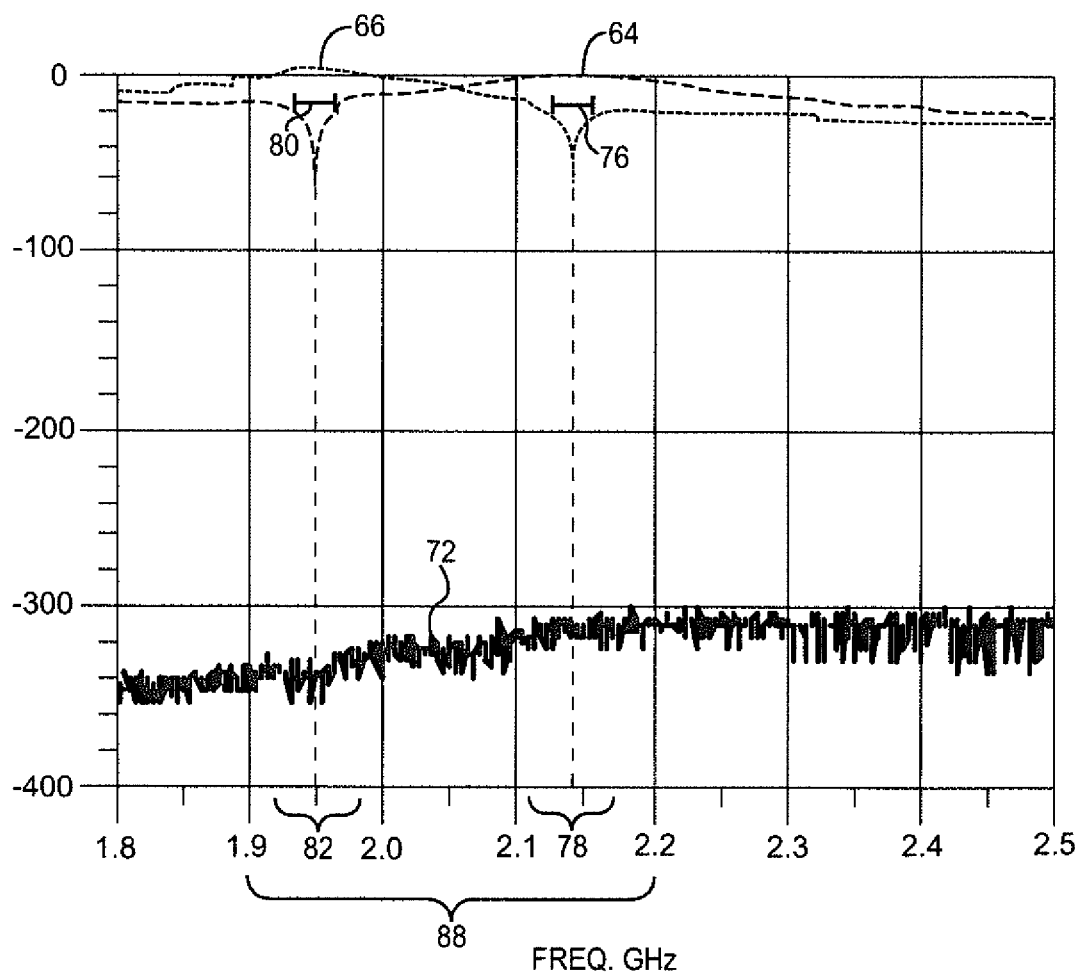
FIG. 5B and FIG. 5C illustrate frequency responses of the RF duplexing device shown in FIG. 5A.
Figure 5C:
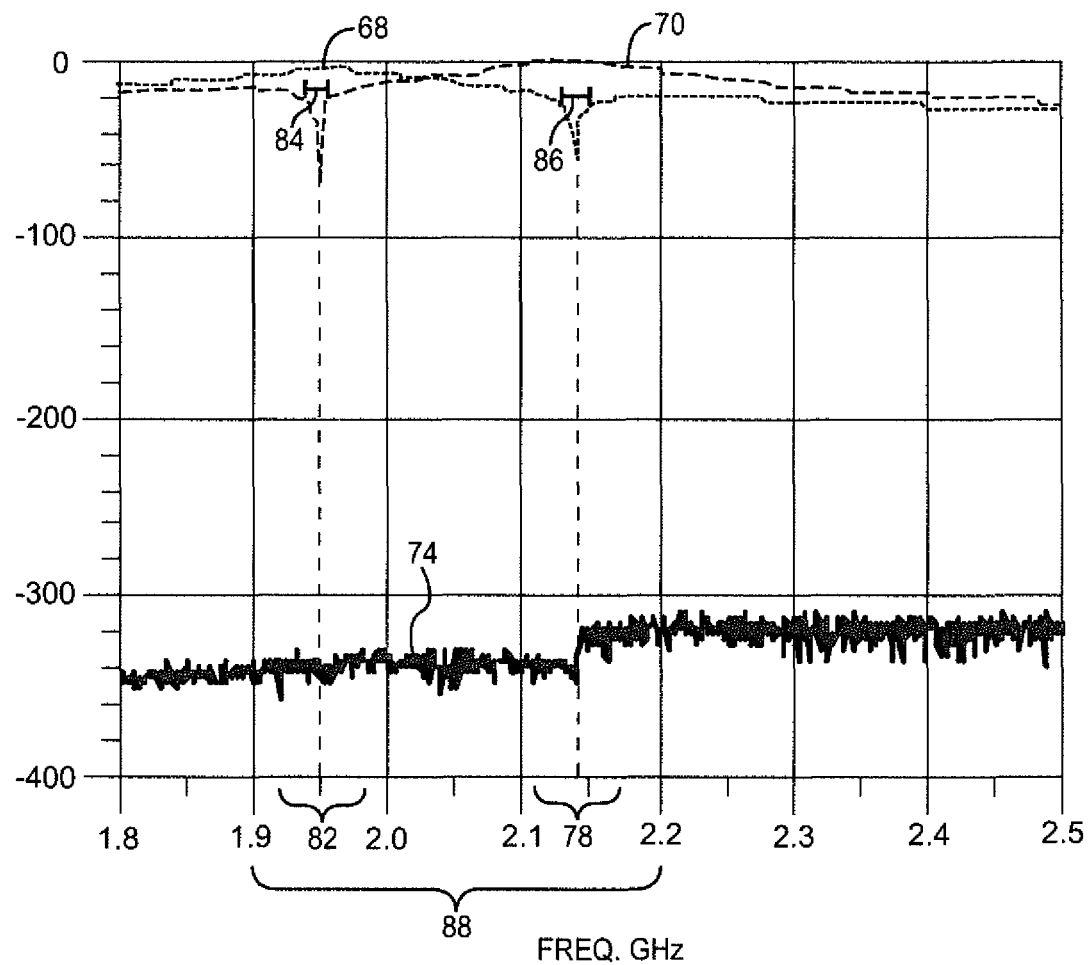

Referring now to FIGS. 5A-5C, FIGS. 5B and 5C illustrate frequency responses of the first duplexer 14(1) and the second duplexer 16(1) as a function of frequency. More specifically, FIGS. 5A and 5B illustrate S-parameters of the RF duplexing device 10(1) as a function of frequency. Assuming that the transmission port 24 is port 1, the antenna port 18 is port 2, the receive port 20 is port 3, and the tuning port 22 is port 4, a curve 64 represents the S41 parameter as a function of frequency, a curve 66 represents the S21 parameter as a function of frequency, a curve 68 represents the S43 parameter as a function of frequency, and a curve 70 represents the S23 parameter as a function of frequency. A curve 72 represents the S31 parameter as a function of frequency, while a curve 74 represents the S13 parameter as a function of frequency. The curve 66 thus represents the first frequency response of the first RF filter 40, while the curve 64 represents the second frequency response of the second RF filter 48. The curve 70 thus represents the third frequency response of the third RF filter 50, and the curve 68 thus represents the fourth frequency response of the fourth RF filter 52. The curve 66 thus includes a first stopband 76 that blocks an RF receive band 78 of the RF receive signal RX. The curve 64 includes a second stopband 80 that blocks an RF transmission band 82 of the RF transmission signal TX. The curve 70 includes a third stopband 84 of the third RF filter 50, where the third stopband 84 is configured to block the RF transmission band 82 of the RF transmission signal TX. The curve 68 includes the fourth stopband 86 of the fourth RF filter 52, where the fourth stopband 86 blocks the RF receive band 78 of the RF receive signal RX.

In this embodiment, each of the first stopband 76 of the first RF filter 40, the second stopband 80 of the second RF filter 48, the third stopband 84 of the third RF filter 50, and the fourth stopband 86 of the fourth RF filter 52 is a notch. The first RF filter 40, the second RF filter 48, the third RF filter 50, and the fourth RF filter 52 may thus be first-order series-coupled resonators that define the notches of the curves 64, 66, 68, and 70. The RF receive band 78 and the RF transmission band 82 may be provided within an RF communication band 88. The stopbands 76, 80, 84, and 86 may be defined as the portion of the curves 64, 66, 68, and 70 within 3 dB of a local minima, in this case, a notch center frequency. Note that the curve 72 illustrates that the S31 response (the response from the transmission port 24 to the receive port 20) provides much greater attenuation than the first stopband 76, the second stopband 80, the third stopband 84, and the fourth stopband 86. This is due to the first phase shift of the first duplexer 14(1) being differential to the second phase shift of the second duplexer 16(1). The curve 74 also demonstrates that there is a great amount of isolation from the receive port 20 to the transmission port 24. This is because the first duplexer 14(1) is transposed with respect to the second duplexer 16(1), and thus the phase shift through the first duplexer 14(1) from the receive port 20 to the transmission port 24 is differential with respect to the phase shift of the second duplexer 16(1) from the receive port 20 to the transmission port 24. Accordingly, the RF duplexing devices 10, 10(1), 10(2), and 10(3) (FIGS. 1-4) isolate the receive port 20 from the upstream RF circuitry URFC (FIG. 5A) coupled to the transmission port 24 and isolate the transmission port 24 from the downstream RF circuitry DRFC (FIG. 5A) coupled at the receive port 20.

Figure 6:
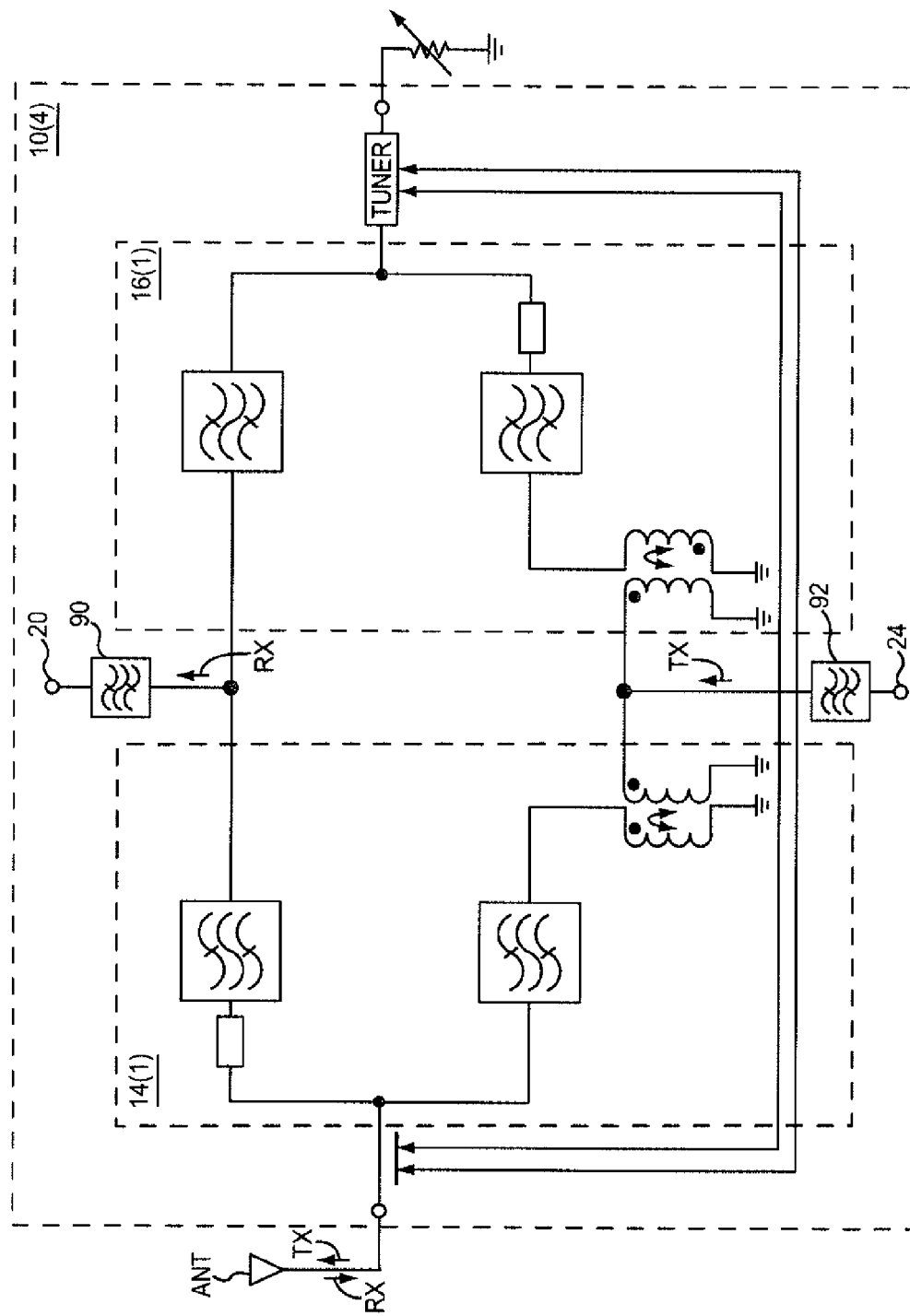
FIG. 6 illustrates another embodiment of the RF duplexing device shown in FIG. 1, which includes an RF filter with a passband that passes an RF receive band, and an RF filter with a passband that passes an RF transmission band.

FIG. 6 illustrates another embodiment of an RF duplexing device 10(4). The RF duplexing device 10(4) is the same as the RF duplexing device 10(3) shown in FIG. 4, except that a fifth RF filter 90 is coupled between the receive port 20, the first duplexer 14(1), and the second duplexer 16(1), and a sixth RF filter 92 is coupled between the transmission port 24, the first duplexer 14(1), and the second duplexer 16(1). The fifth RF filter 90 may have a fifth frequency response that defines a passband that passes the RF receive band of the RF receive signal RX. The fifth RF filter 90 thus blocks anything outside of the passband to further isolate the receive port 20. The additional filtering provided by the fifth RF filter 90 may thus be useful in cases where perfect matching is not provided, or when there are particularly strict isolation requirements. The sixth RF filter 92 has a sixth frequency response that defines a passband configured to pass the RF transmission band of the RF transmission signal TX. The sixth RF filter 92 thus blocks transmissions outside of the passband. Thus, the sixth RF filter 92 may be useful when impedances are not precisely matched in the RF duplexing device 10(4) and/or when there are particularly strict isolation requirements.

Figure 7:
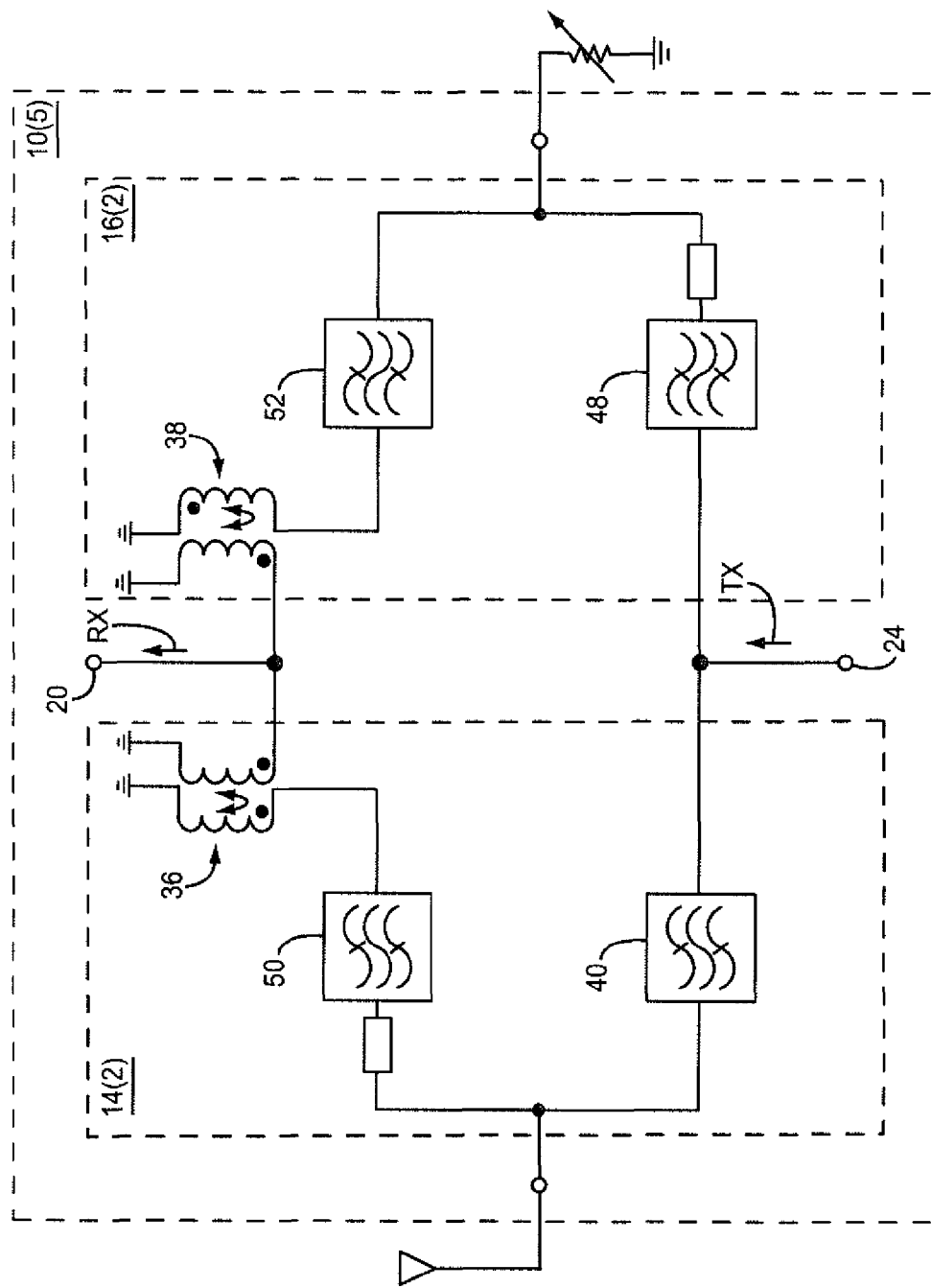
FIG. 7 illustrates yet another embodiment of the RF duplexing device shown in FIG. 1, where a non-inverting transformer and an inverting transformer are coupled to the receive port rather than the transmission port (as in the embodiment shown in FIG. 2).

FIG. 7 illustrates another embodiment of an RF duplexing device 10(5). The RF duplexing device 10(5) is the same as the RF duplexing device 10(1) described above with regard to FIG. 2, except that the inverting transformer 38 and the non-inverting transformer 36 are coupled to the receive port 20 rather than to the transmission port 24. More specifically, a first duplexer 14(2) has the non-inverting transformer 36 coupled between the receive port 20 and the third RF filter 50. A second duplexer 16(2) includes the inverting transformer 38 coupled between the receive port 20 and the fourth RF filter 52. Since the third RF filter 50 is identical to the second RF filter 48, and since the first RF filter 40 is identical to the fourth RF filter 52, the first duplexer 14(2) is transposed with respect to the second duplexer 16(2). The inverting transformer 38 provides a polarity inversion such that a first phase shift of the first duplexer 14(2) is differential with respect to a second phase shift of the second duplexer 16(2). However, in this example, the polarity inversion is provided at the receive port 20 rather than at the transmission port 24. Otherwise, the RF duplexing device 10(5) operates in the same manner as the RF duplexing device 10(1) described above with regard to FIG. 2.

FIG. 8 illustrates an exemplary RF duplexing device 10(4). The exemplary RF duplexing device 10(4) is another embodiment of the RF duplexing device 10 shown in FIG. 1. The RF duplexing device 10(4) includes a first duplexer 14(3) and a second duplexer 16(3). The first duplexer 14(3) is coupled to the transmission port 24 and the receive port 20. Similarly, the second duplexer 16(3) is coupled to the transmission port 24 and the receive port 20. As with the previous embodiments, the first duplexer 14(3) is configured to provide a first phase shift from the transmission port 24 to the receive port 20 in the signal direction 26. The second duplexer 16(3) is configured to provide a second phase shift that is differential to the first phase shift from the transmission port 24 to the receive port 20 in the signal direction 28. As with the RF duplexing device 10(1) shown in FIG. 2, the first duplexer 14(3) includes the non-inverting transformer 36 coupled to the transmission port 24. The second duplexer 16(3) includes the inverting transformer 38 coupled to the transmission port 24. However, the first duplexer 14(3) also includes a non-inverting transformer 94 coupled to the receive port 20. The second duplexer 16(3) also includes a non-inverting transformer 96 coupled to the receive port 20. The polarity inversion provided by the inverting transformer 38 results in the second phase shift of the second duplexer 16(3) being differential to the first phase shift of the first duplexer 14(3). By including the non-inverting transformers 94 and 96, an impedance transformation can be provided from the antenna port 18 to the tuning port 22. For instance, the non-inverting transformers 36, 94, 96 and the inverting transformer 38 may have a turns ratio of 1:M, which thus transforms an impedance at the antenna port 18 to a lower impedance at the tuning port 22. This configuration is advantageous if the impedance presented by the antenna ANT at the antenna port 18 is particularly high. The tuner TUN and the tuner TUN1 do not need to provide a high impedance in order to provide matching at the antenna port 18. Rather, the tuner TUN and the tuner TUN1 may have a low impedance, which is transformed into a high impedance by the transformers 36, 38, 94, and 96 to provide matching at the antenna port 18.

The second duplexer 16(3) is transposed with respect to the first duplexer 14(3). In this embodiment, the first duplexer 14(3) includes a first RF filter 40' coupled between the transmission port 24 and the antenna port 18. The first RF filter 40' has a first frequency response defining a first stopband that blocks the RF receive band of the RF receive signal RX. The first RF filter 40' is coupled in shunt with respect to the antenna port 18. More specifically, the first RF filter 40' is coupled in series between ground and the primary winding 42 of the non-inverting transformer 36. The second duplexer 16(3) includes a second RF filter 48' coupled between the transmission port 24 and the tuning port 22. The second RF filter 48' has a second frequency response defining a second stopband that blocks the RF transmission band. The second RF filter 48' is coupled in shunt with respect to the tuning port 22. More specifically, the second RF filter 48' is coupled in series between ground and the primary winding 46 of the inverting transformer 38. The first duplexer 14(3) also includes a third RF filter 50' coupled between the antenna port 18 and the receive port 20. The third RF filter 50' has a third frequency response defining a third stopband that blocks the RF transmission band of the RF transmission signal TX. The third RF filter 50' is coupled in shunt with respect to the antenna port 18. More specifically, the third RF filter 50' is coupled in series between ground and a primary winding 98 of the non-inverting transformer 94. The second duplexer 16(3) includes a fourth RF filter 52' coupled between the tuning port 22 and the receive port 20. The fourth RF filter 52' has a fourth frequency response defining a fourth stopband that blocks the RF receive band of the RF receive signal RX. The fourth RF filter 52' is coupled in shunt with respect to the tuning port 22. More specifically, the fourth RF filter 52' is coupled in series between a primary winding 100 and ground.

In this embodiment, the second RF filter 48' is identical to the third RF filter 50', while the first RF filter 40' is identical to the fourth RF filter 52'. As such, the first duplexer 14(3) and the second duplexer 16(3) are transposed with respect to one another. The first duplexer 14(3) is configured to provide a first phase shift of ΔTXTM36+ΔRXTM94. The ΔTXTM36 is a phase shift of the non-inverting transformer 36 and the ΔRXTM94 is a phase shift of the non-inverting transformer 94 in the first duplexer 14(3). The second phase shift provided by the second duplexer 16(3) is equal to ΔTXTM38+180°+ΔRXTM96. The ΔTXTM38 and the ΔRXTM96 are phase shifts provided by the inverting transformer 38 and the non-inverting transformer 96 in the second duplexer 16(3). As such, assuming that the impedances in the signal direction 26 are the same as the impedances in the signal direction 28, any signal outside of both the RF transmission band and the RF receive band at the transmission port 24 cancel at the receive port 20. It is presumed that the first RF filter 40', the second RF filter 48', the third RF filter 50', and the fourth RF filter 52' are symmetrical, meaning that each has the same frequency response to a signal in the signal direction 26 and in the signal direction 28. Thus, the first duplexer 14(3) provides the first phase shift from the receive port 20 to the transmission port 24 and the second duplexer 16(3) also provides the second phase shift from the receive port 20 to the transmission port 24. Therefore, any signal at the transmission port 24 outside of both the RF transmission band and the RF receive band will cancel at the transmission port 24.

FIG. 9 illustrates an exemplary RF duplexing device 10(5). The exemplary RF duplexing device 10(5) is another embodiment of the RF duplexing device 10 shown in FIG. 1. A first duplexer 14(4) includes the first RF filter 40 and the third RF filter 50 described above with respect to FIGS. 2-7. A second duplexer 16(4) includes the second RF filter 48 and the fourth RF filter 52 described above with respect to FIGS. 2-7. However, in this embodiment, the first duplexer 14(4) includes a first hybrid transformer 102 coupled to the transmission port 24, and a second hybrid transformer 104 coupled to the receive port 20. The first hybrid transformer 102 is configured to provide a first octave phase shift, which in this example is a phase shift of −45°. The second hybrid transformer 104 is configured to provide a second octave phase shift that is substantially equal to the first octave phase shift. Thus, the second hybrid transformer 104 in the example shown in FIG. 9 also provides a phase shift approximately equal to −45°. The second duplexer 16(4) includes a third hybrid transformer 106 coupled to the transmission port 24 and configured to provide a third octave phase shift that is antipodal to the first octave phase shift. Thus, in this example, the third octave phase shift is approximately equal to +45°.

The second duplexer 16(4) includes a fourth hybrid transformer 108 coupled to the receive port 20. The fourth hybrid transformer 108 is configured to provide a fourth octave phase shift that is substantially equal to the third octave phase shift. Accordingly, the fourth hybrid transformer 108 also provides a phase shift of approximately +45°. Since the second duplexer 16(4) is transposed with respect to the first duplexer 14(4), a phase shift of Δ is provided from the first hybrid transformer 102 to the second hybrid transformer 104, and a phase shift of Δ is provided from the third hybrid transformer 106 to the fourth hybrid transformer 108. Accordingly, the first duplexer 14(4) is configured to provide a first phase shift approximately equal to Δ−90° from the transmission port 24 to the receive port 20 in the signal direction 26. The second duplexer 16(4) is configured to provide a second phase shift equal to approximately Δ+90° from the transmission port 24 to the receive port 20 in the signal direction 28. The second duplexer 16(4) is therefore configured to provide the second phase shift such that the second phase shift is differential to the first phase shift from the transmission port 24 to the receive port 20. This is because a phase shifting difference between the first phase shift of the first duplexer 14(4) and the second phase shift of the second duplexer 16(4) have a phase shifting difference of approximately 180°. Since the second duplexer 16(4) is transposed with respect to the first duplexer 14(4), the RF duplexing device 10(5) is symmetrical. Thus, the second duplexer 16(4) also provides a second phase shift from the receive port 20 to the transmission port 24, but this time in the signal direction 26. Similarly, the first duplexer 14(4) provides the first phase shift from the receive port 20 to the transmission port 24, but this time in the signal direction 28. The first hybrid transformer 102, the second hybrid transformer 104, the third hybrid transformer 106, and the fourth hybrid transformer 108 may each be provided as part of a hybrid transformer network.

To provide signal cancellation from the antenna port 18 to the tuning port 22, a first transmission line phase-shifting element (TLPSE) 109A is provided in the first duplexer 14(4) and a second TLPSE 109B is provided in the second duplexer 16(4). Both the first TLPSE 109A and the second TLPSE 109B are transmission line quadrature phase-shifting elements (TLQPSEs) that provide approximately the same quadrature phase shift. In this example, the quadrature phase shift is +90°.

FIG. 10 illustrates another embodiment of an RF duplexing device 110. The RF duplexing device 110 includes a first duplexer 14(5) and a second duplexer 16(5). The first duplexer 14(5) is the same as the first duplexer 14(4) described above for FIG. 9, except that the second hybrid transformer 104 is formed on a semiconductor substrate 112, while the first hybrid transformer 102, the first RF filter 40, the first TLPSE 109A, and the third RF filter 50 are formed on the semiconductor substrate 12. The second duplexer 16(5) is the same as the second duplexer 16(4) described above with respect to FIG. 9, except that the fourth hybrid transformer 108 is formed on the semiconductor substrate 112, while the third hybrid transformer 106, the second RF filter 48, the second TLPSE 109B, and the fourth RF filter 52 are formed on the semiconductor substrate 12. The second hybrid transformer 104 is coupled to the third RF filter 50 of the first duplexer 14(5) at a port 114. The fourth hybrid transformer 108 is coupled to the fourth RF filter 52 of the second duplexer 16(5) at a port 116. Thus, for example, downstream RF circuitry, such as a receiver chain, may be formed on the semiconductor substrate 112, while upstream RF circuitry, such as a transmission chain, may be formed on the semiconductor substrate 12. The downstream RF circuitry formed on the semiconductor substrate 112 may include a hybrid network with the second hybrid transformer 104 and the fourth hybrid transformer 108. The first hybrid transformer 102 and the third hybrid transformer 106 may be part of a hybrid network used by the upstream RF circuitry formed on the semiconductor substrate 12.

FIG. 11 illustrates another embodiment of an RF duplexing device 10(6). The RF duplexing device 10(6) includes a first duplexer 14(6) and a second duplexer 16(6). The first duplexer 14(6) is coupled to the receive port 20 and to the transmission port 24. The second duplexer 16(6) is also coupled to the receive port 20 and the transmission port 24. As with the previous embodiments described above, the first duplexer 14(6) is configured to provide a first phase shift from the transmission port 24 to the receive port 20. The second duplexer 16(6) is configured to provide a second phase shift that is differential to the first phase shift from the transmission port 24 to the receive port 20. The second duplexer 16(6) is transposed with respect to the first duplexer 14(6). In particular, the first duplexer 14(6) includes the first RF filter 40 and the third RF filter 50, while the second duplexer 16(6) includes the second RF filter 48 and the fourth RF filter 52 described above with regard to the embodiments shown in FIGS. 2-7. However, rather than using transformers, the first duplexer 14(6) includes a first transmission line phase-shifting element (TLPSE) 118 and a second TLPSE 120. The first TLPSE 118 is coupled between the transmission port 24 and the antenna port 18, while the second TLPSE 120 is coupled between the receive port 20 and the antenna port 18. In this embodiment, the first TLPSE 118 and the second TLPSE 120 are both transmission line negative octave phase-shifting elements (TLNOPSEs). Accordingly, the first TLPSE 118 provides a phase shift from the transmission port 24 to the antenna port 18 of approximately −45°. The second TLPSE 120 also provides a phase shift of approximately −45° between the antenna port 18 and the receive port 20. As such, the first phase shift in the signal direction 26 provided by the first duplexer 14(6) from the transmission port 24 to the receive port 20 is approximately a quadrature phase shift, or more specifically, approximately −90°. As shown in FIG. 11, the first TLPSE 118 is coupled to the transmission port 24 while the second TLPSE 120 is coupled to the receive port 20. The second duplexer 16(6) includes a third TLPSE 122 and a fourth TLPSE 124. The third TLPSE 122 is coupled between the transmission port 24 and the tuning port 22. The fourth TLPSE 124 is coupled between the receive port 20 and the tuning port 22. The third TLPSE 122 and the fourth TLPSE 124 are each transmission line positive octave phase-shifting elements (TLPOPSEs). Thus, the third TLPSE 122 coupled to the transmission port 24 provides a phase shift of approximately +45°. Similarly, the fourth TLPSE 124 coupled to the receive port 20 also provides a phase shift of approximately +45°. Accordingly, while the first phase shift is approximately equal to Δ−90°, the second phase shift provided by the second duplexer 16(6) is approximately Δ+90°. As such, the second phase shift is differential to the first phase shift because a phase-shifting difference between the first TLPSE 118 and the second TLPSE 120 of the first duplexer 14(6) and the third TLPSE 122 and the fourth TLPSE 124 of the second duplexer 16(6) is such that the second phase shift is differential to the first phase shift. In this particular embodiment, the phase shift of the third TLPSE 122 plus the phase shift of the fourth TLPSE 124 is +90°, while the phase shift of the first TLPSE 118 plus the phase shift of the second TLPSE 120 is −90°. The phase-shifting difference is thus equal to 180°, so that the first phase shift and the second phase shift are differential with respect to one another.

Those skilled in the art will recognize improvements and modifications to the preferred embodiments of the present disclosure. All such improvements and modifications are considered within the scope of the concepts disclosed herein and the claims that follow.

What is claimed is:

1. A radio frequency (RF) duplexing device comprising:
a transmission port;
a receive port;
a first duplexer coupled to the transmission port and the receive port, and configured to provide a first phase shift from the transmission port to the receive port, wherein the first duplexer includes a non-inverting transformer coupled to the receive port; and
a second duplexer coupled to the transmission port and the receive port, and configured to provide a second phase shift that is differential to the first phase shift from the transmission port to the receive port, wherein the second duplexer includes an inverting transformer coupled to the receive port wherein the inverting transformer is configured to provide a polarity inversion such that the second phase shift is differential to the first phase shift.

2. The RF duplexing device of claim 1 wherein the second duplexer is transposed with respect to the first duplexer.

3. The RF duplexing device of claim 1 wherein the non-inverting transformer and the inverting transformer have identical turn ratios.

4. The RF duplexing device of claim 1 further comprising a first RF filter having a first frequency response defining a first stopband that blocks an RF receive band and a second RF filter having a second frequency response defining a second stopband that blocks an RF transmission band, wherein:
the non-inverting transformer comprises:
a first primary winding coupled to the transmission port; and
a first secondary winding coupled to the first RF filter; and
the inverting transformer comprises:
a second primary winding coupled to the transmission port; and
a second secondary winding coupled to the second RF filter.

5. The RF duplexing device of claim 1 wherein:
the first duplexer further includes a second non-inverting transformer coupled to the receive port; and
the second duplexer further includes a third non-inverting transformer coupled to the receive port.

6. The RF duplexing device of claim 1 further comprises an antenna port coupled to the first duplexer.

7. The RF duplexing device of claim 6 further comprises a tuning port coupled to the second duplexer.

8. The RF duplexing device of claim 7 wherein:
the first duplexer and the second duplexer are configured to provide a third phase shift from the antenna port to the tuning port in a first signal direction; and
the first duplexer and the second duplexer are configured to provide a fourth phase shift from the antenna port to the tuning port in a second signal direction, wherein the fourth phase shift is differential to the third phase shift from the antenna port to the transmission port.

9. The RF duplexing device of claim 8 wherein the third phase shift is substantially equal to the first phase shift and the fourth phase shift is substantially equal to the second phase shift.

10. The RF duplexing device of claim 8 wherein the third phase shift has a quadrature phase-shifting difference with the first phase shift and the fourth phase shift has a quadrature phase-shifting difference with the second phase shift.

11. The RF duplexing device of claim 7 wherein:
the first duplexer comprises:
a first RF filter coupled between the antenna port and the receive port, wherein the first RF filter has a first frequency response defining a first stopband that blocks an RF transmission band; and
a second RF filter coupled between the transmission port and the antenna port, wherein the second RF filter has a second frequency response defining a second stopband that blocks an RF receive band; and
the second duplexer comprises:
a third RF filter coupled between the tuning port and the receive port, wherein the third RF filter has a third frequency response defining a third stopband that blocks the RF receive band; and
a fourth RF filter coupled between the transmission port and the tuning port, wherein the fourth RF filter has a fourth frequency response defining a fourth stopband that blocks the RF transmission band.

12. The RF duplexing device of claim 11 wherein:
the non-inverting transformer is coupled between the receive port and the first RF filter; and
the inverting transformer is coupled between the receive port and the third RF filter, wherein the inverting transformer is configured to provide a polarity inversion such that the second phase shift is differential to the first phase shift.

13. The RF duplexing device of claim 7 wherein:
the transmission port is operable to input an RF transmission signal that operates within an RF transmission band and to input spurious transmission noise emissions outside of the RF transmission band and an RF receive band;
the receive port is operable to output an RF receive signal that operates within the RF receive band;
the first duplexer is configured to pass the RF transmission signal from the transmission port to the antenna port; and
the first duplexer and the second duplexer are operably associated so as to split the spurious transmission noise emissions into a first hybrid noise signal that propagates from the transmission port to the receive port through the first duplexer, a second hybrid noise signal that propagates from the transmission port to the receive port through the second duplexer, and a third hybrid noise signal that propagates from the transmission port to the tuning port through the second duplexer, wherein the first hybrid noise signal is outside both the RF transmission band and the RF receive band, the second hybrid noise signal is outside both the RF transmission band and the RF receive band, and the third hybrid noise signal is within the RF receive band; wherein the first phase shift provided by the first duplexer to the first hybrid noise signal from the transmission port to the receive port and the second phase shift provided by the second duplexer to the second hybrid noise signal from the transmission port to the receive port result in the first hybrid noise signal and the second hybrid noise signal substantially cancelling at the receive port.

14. The RF duplexing device of claim 13 wherein the second duplexer further comprises a tuner coupled to the tuning port, the tuner being configured to filter the third hybrid noise signal.

15. The RF duplexing device of claim 14 further comprising a bidirectional coupler connected between the antenna port and the first duplexer, wherein the bidirectional coupler is coupled to the tuner and is operably associated with the tuner such that an impedance of the tuner is adjustable through the bidirectional coupler.

16. The RF duplexing device of claim 15 wherein the tuner is operably associated to prevent high power transmissions to the tuner.

17. The RF duplexing device of claim 1 wherein the first duplexer and the second duplexer are formed on one or more semiconductor substrates.

18. A method of duplexing a radio frequency (RF) transmission signal and an RF receive signal comprising:
inputting the RF transmission signal at a transmission port, wherein the transmission port is coupled to a first duplexer and a second duplexer;
outputting the RF receive signal from a receive port, wherein the receive port is coupled to the first duplexer and the second duplexer, wherein the first duplexer includes a non-inverting transformer coupled to the receive port and the second duplexer includes and the second duplexer includes an inverting transformer coupled to the receive port;
providing a first phase shift with the non-inverting transformer from the transmission port to the receive port through the first duplexer while the RF transmission signal is being input at the transmission port and while the RF receive signal is being output from the receive port; and
providing a second phase shift with the inverting transformer from the transmission port to the receive port through the second duplexer while the RF transmission signal is being input at the transmission port and while the RF receive signal is being output from the receive port, wherein the inverting transformer provides a polarity inventions such that the second phase shift is differential to the first phase shift from the transmission port to the receive port.

19. The method of claim 18 wherein the second duplexer is transposed with respect to the first duplexer.

20. The method of claim 18 wherein the non-inverting transformer and the inverting transformer have identical turn ratios.

* * * * *